(12) United States Patent
Kawasuji et al.

(10) Patent No.: US 8,855,164 B2
(45) Date of Patent: Oct. 7, 2014

(54) LASER APPARATUS

(75) Inventors: Yasufumi Kawasuji, Oyama (JP);
Osamu Wakabayashi, Hiratsuka (JP);
Junichi Fujimoto, Oyama (JP); Hideo Iwase, Utsunomiya (JP)

(73) Assignee: Gigaphoton Inc., Tochigi (JP)

( * ) Notice: Subject to any disclaimer, the term of this patent is extended or adjusted under 35 U.S.C. 154(b) by 78 days.

(21) Appl. No.: 13/809,584
(22) PCT Filed: Feb. 17, 2012
(86) PCT No.: PCT/JP2012/054477
§ 371 (c)(1),
(2), (4) Date: Jan. 10, 2013
(87) PCT Pub. No.: WO2012/132675
PCT Pub. Date: Oct. 4, 2012

(65) Prior Publication Data
US 2013/0114215 A1   May 9, 2013

(30) Foreign Application Priority Data

Mar. 30, 2011  (JP) ................................ 2011-076294
Jul. 22, 2011  (JP) ................................ 2011-160656
Nov. 24, 2011  (JP) ................................ 2011-256489

(51) Int. Cl.
*H01S 3/22*   (2006.01)
*H01S 3/02*   (2006.01)
*G02B 7/00*   (2006.01)
*H01S 3/07*   (2006.01)
*H05G 2/00*   (2006.01)
*H01S 3/23*   (2006.01)
*H01S 3/00*   (2006.01)
*H01S 3/223*  (2006.01)

(52) U.S. Cl.
CPC ... *G02B 7/00* (2013.01); *H01S 3/02* (2013.01); *H01S 3/2366* (2013.01); *H01S 3/076* (2013.01); *H05G 2/008* (2013.01); *H01S 3/0071* (2013.01); *H05G 2/003* (2013.01); *H01S 3/2232* (2013.01)
USPC .................. 372/57; 372/55; 372/98

(58) Field of Classification Search
USPC ................................. 372/57, 55, 98
See application file for complete search history.

(56) References Cited

U.S. PATENT DOCUMENTS

| 3,921,098 | A  |   | 11/1975 | Hoag |
|---|---|---|---|---|
| 4,757,511 | A  |   | 7/1988 | Klingel et al. |
| 5,867,519 | A  |   | 2/1999 | Filgas |
| 2004/0105479 | A1 | * | 6/2004 | Klene et al. ................... 372/55 |
| 2005/0078386 | A1 |   | 4/2005 | Takabayashi |
| 2006/0045151 | A1 | * | 3/2006 | Vakhshoori et al. ............ 372/32 |
| 2009/0103575 | A1 | * | 4/2009 | Abe et al. ........................ 372/5 |

FOREIGN PATENT DOCUMENTS

| JP | 58-021890 A | 2/1983 |
|---|---|---|
| JP | 3-069183 A | 3/1991 |
| WO | WO-2006/025876 A2 | 3/2006 |

OTHER PUBLICATIONS

International Search Report issued in International Application No. PCT/JP2012/054477 mailed Jun. 14, 2012.

* cited by examiner

*Primary Examiner* — Kinam Park
(74) *Attorney, Agent, or Firm* — McDermott Will & Emery LLP

(57) ABSTRACT

A laser apparatus may include: a first module including an oscillator configured to output a laser beam and an oscillator support portion for supporting the oscillator; a second module including a beam delivery unit for delivering the laser beam and a beam delivery unit support portion for supporting the beam delivery unit; a third module including an amplifier for amplifying the laser beam and an amplifier support portion for supporting the amplifier; and a frame on which the modules are placed, the frame including mounts on which the oscillator support portion, the beam delivery support portion and the amplifier support portion are placed.

17 Claims, 26 Drawing Sheets

LASER APPARATUS

CROSS-REFERENCE TO RELATED APPLICATIONS

This application is the U.S. National Phase under 35 U.S.C. §371 of International Application No. PCT/JP2012/054477 filed on Feb. 17, 2012, which in turn claims the benefit from Japanese Patent Application No. 2011-076294 filed Mar. 30, 2011, Japanese Patent Application No. 2011-160656 filed Jul. 22, 2011, and Japanese Patent Application No. 2011-256489 filed Nov. 24, 2011, the disclosures of which Applications are incorporated by reference herein.

BACKGROUND

1. Technical Field

The present disclosure relates to laser apparatuses.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication at 32 nm or less, for example, an exposure apparatus is being developed which combines an apparatus for generating extreme ultraviolet (EUV) light at a wavelength of approximately 13 nm with a reduced projection reflective optical system.

Three kinds of apparatuses for generating EUV light are generally known including a Laser Produced Plasma (LPP) type apparatus in which plasma is generated by irradiating a target material with a laser beam, a Discharge Produced Plasma (DPP) type apparatus in which plasma is generated by electric discharge, and a Synchrotron Radiation (SR) type apparatus in which orbital radiation is used to generate plasma.

SUMMARY

A laser apparatus according to one aspect of the present disclosure may include: a first module including an oscillator configured to output a laser beam and an oscillator support portion for supporting the oscillator; a second module including a beam delivery unit for delivering the laser beam and a beam delivery unit support portion for supporting the beam delivery unit; a third module including an amplifier for amplifying the laser beam and an amplifier support portion for supporting the amplifier; and a frame on which the first, second, and third modules are placed, the frame including mounts on which the oscillator support portion, the beam delivery unit support portion, and the amplifier support portion are placed.

A laser apparatus according to another aspect of the present disclosure may include: a module including an amplifier for amplifying a laser beam and first, second, and third support portions for supporting the amplifier; and a frame on which the module is placed, the frame including first, second, and third mounts on which the first, second, and third support portions are placed, respectively, wherein the module further includes an input portion through which an input beam enters the module from a first external unit and an output portion through which an output beam is outputted toward a second external unit, the first support portion is provided at a first position toward the input portion as viewed from the center of the module, the second support portion is provided at a second position toward the direction in which the input beam enters the module as viewed from the first position, and the third support portion is provided at a third position.

A laser apparatus according to yet another aspect of the present disclosure may include: a module including an amplifier for amplifying a laser beam and first, second, and third support portions for supporting the amplifier; and a frame on which the module is placed, the frame including first, second, and third mounts on which the first, second, and third support portions are placed, respectively, wherein the module further includes an output portion through which an output beam is outputted toward an external unit, the first support portion is provided at a first position toward the output portion as viewed from the center of the module, the second support portion is provided at a second position opposite to the direction in which the output beam is outputted from the module as viewed from the first position, and the third support portion is provided at a third position.

A laser apparatus according to yet another aspect of the present disclosure may include: a module including an amplifier for amplifying a laser beam and first, second, and third support portions for supporting the amplifier; and a frame on which the module is placed, the frame including first, second, and third mounts on which the first, second, and third support portions are placed, respectively, wherein the module further includes an input portion through which an input beam enters the module from a first external unit and an output portion through which an output beam is outputted toward a second external unit, the first support portion is provided at a first position toward the input portion as viewed from the center of the module, the second support portion is provided at a second position toward the output portion as viewed from the center of the module, and the third support portion is provided at a third position.

A laser apparatus according to yet another aspect of the present disclosure may include: a module including an amplifier for amplifying a laser beam and first, second, and third support portions for supporting the amplifier; and a frame on which the module is placed, the frame including first, second, and third mounts on which the first, second, and third support portions are placed, respectively, and first, second, and third installation portions on which the first, second, and third mounts are placed, respectively, wherein the first mount positions the first support portion at a predetermined position of the frame, the second mount is placed on the second installation portion so as to be movable along a step formed on the second installation portion, the second installation portion being inclined with respect to the horizontal plane, whereby the second mount is pressed against the step, and the second mount supports the second support portion and positions the second support portion at a predetermined position of the second mount such that the second support portion is movable in a direction along the step with respect to the frame, and the third mount supports the third support portion such that the third support portion is movable with respect to the frame within the horizontal plane.

A laser apparatus according to yet another aspect of the present disclosure may include: a module including an amplifier for amplifying a laser beam and first, second, and third support portions for supporting the amplifier; and a frame on which the module is placed, the frame including first, second, and third mounts on which the first, second, and third support portions are placed, respectively, and first, second, and third installation portions on which the first, second, and third mounts are placed, respectively, wherein the first mount positions the first support portion at a predetermined position of the frame, the second mount is placed on the second installation portion so as to be movable along a step formed on the second installation portion, one of the second installation portion and the second mount being provided with an elastic member, whereby the second mount is pressed against the step, and the second mount supports the second support portion and positions the second support portion at a predetermined position of the second mount such that the second support portion is movable in a direction along the step with respect to the frame, and the third mount supports the third support portion such that the third support portion is movable with respect to the frame within the horizontal plane.

A laser apparatus according to yet another aspect of the present disclosure may include: a module including a beam delivery unit for delivering a laser beam and first, second, and third support portions for supporting the beam delivery unit; and a frame on which the module is placed, the frame including first, second, and third mounts on which the first, second, and third support portions are placed, respectively, wherein the first and second mounts are provided on a first surface of the frame, the third mount is provided on a second surface of the frame, the second surface intersecting with the first surface, the first mount positions the first support portion at a predetermined position, the second mount supports the second support portion such that the second support portion is movable toward the first mount, and the third mount supports the third support portion such that the third support portion is movable along the second surface.

A frame according to yet another aspect of the present disclosure may include mounts on which support portions of first, second, and third modules are placed, respectively, the first module including an oscillator configured to output a laser beam and an oscillator support portion for supporting the oscillator, the second module including a beam delivery unit for delivering the laser beam and a beam delivery unit support portion for supporting the beam delivery unit, and the third module including an amplifier for amplifying the laser beam and an amplifier support portion for supporting the amplifier.

BRIEF DESCRIPTION OF THE DRAWINGS

Hereinafter, selected embodiments of the present disclosure will be described with reference to the accompanying drawings.

DESCRIPTION OF PREFERRED EMBODIMENTS

Hereinafter, selected embodiments of the present disclosure will be described in detail with reference to the accompanying drawings. The embodiments to be described below are merely illustrative in nature and do not limit the scope of the present disclosure. Further, configurations and operations described in each embodiment are not all essential in implementing the present disclosure. Note that like elements are referenced by like reference symbols and duplicate descriptions thereof will be omitted herein.

CONTENTS

1. Overview
2. Terms
3. Overview of EUV Light Generation System
    3.1 Configuration
    3.2 Operation
4. First Embodiment
    4.1 Configuration of Laser Apparatus
    4.2 Arrangement of Modules
    4.3 Support Mechanism for Main Amplifier
    4.4 Support Mechanism for Preamplifier
    4.5 Support Mechanism for Beam Delivery Unit
    4.6 Support Mechanism for Master Oscillator
5. Second Embodiment
6. Third Embodiment
7. Fourth Embodiment
8. Fifth Embodiment
9. Sixth Embodiment
10. Seventh Embodiment
11. Eighth Embodiment
12. Ninth Embodiment
13. Tenth Embodiment
14. Eleventh Embodiment

1. Overview

In some embodiments of the present disclosure, modules, such as a main amplifier for amplifying a laser beam, may include leg portions, and the leg portions may be placed at predetermined positions on a frame, whereby the modules may be positioned. Further, the module may be provided with an extension mechanism having a wheel. Extending the extension mechanism may allow the leg portions to be distanced from the frame, whereby the module may be moved with respect to the frame. In addition, by contracting the extension mechanism and placing the leg portions at the predetermined positions on the frame, the module may be positioned at the predetermined positioned on the frame.

2. Terms

Terms used in the present application will be defined as follows. The terms "upstream" and "downstream" on a beam path of a laser beam are defined in terms of the direction in which the laser beam travels. That is, "upstream" is the side closer to a master oscillator, which serves as the generation source of the laser beam, and "downstream" is the side closer to a plasma generation region.

3. Overview of EUV Light Generation System

3.1 Configuration

Figure 1:
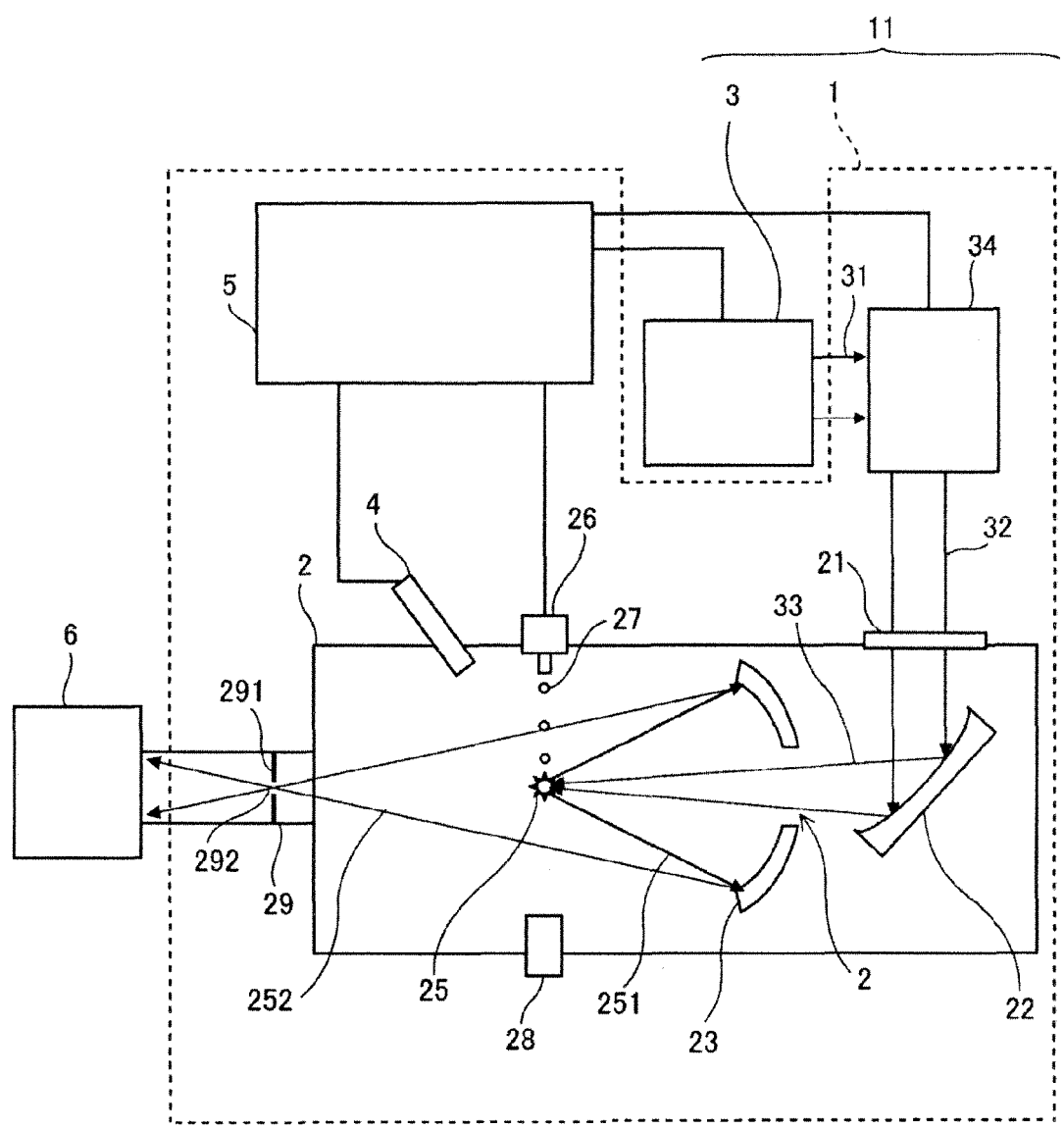
FIG. 1 schematically illustrates the configuration of an exemplary LPP type EUV light generation system.

FIG. 1 schematically illustrates a configuration of an exemplary LPP type EUV light generation apparatus 1. The EUV light generation apparatus 1 may be used with at least one laser apparatus 3. In the present application, a system including the EUV light generation apparatus 1 and the laser apparatus 3 may be referred to as an EUV light generation system 11. As illustrated in FIG. 1 and described in detail below, the EUV light generation system 1 may include a sealed chamber 2, a target supply unit (droplet generator 26, for example), and so forth. The target supply unit may be mounted to the chamber 2 so as to pass through a wall of the chamber 2, for example. A target material to be supplied by the target supply unit may include, but is not limited to, tin, terbium, gadolinium, lithium, xenon, or any combination thereof.

The chamber 2 may have a through-hole formed in its wall, and a pulsed laser beam 32 may travel through the through-hole. Alternatively, chamber 2 may be provided with at least one window 21, through which the pulsed laser beam 32 may travel into chamber 2. An EUV collector mirror 23 having a spheroidal surface may be disposed, for example, inside the chamber 2. The EUV collector mirror 23 may have a multi-layered reflective film formed on the spheroidal surface, and the reflective film may include, for example, molybdenum and silicon being alternately laminated. The EUV collector mirror 23 may have first and second foci. The EUV collector mirror 23 may preferably be positioned such that the first focus lies in a plasma generation region 25 and the second focus lies in an intermediate focus (IF) region 292 defined by the specification of an exposure apparatus. The EUV collector mirror 23 may have a through-hole 24 formed at the center thereof.

Referring again to FIG. 1, the EUV light generation apparatus 1 may be connected to an EUV light generation controller 5. The target sensor 4 may be equipped with an imaging function and may detect at least one of the presence, trajectory, and position of a target.

Further, the EUV light generation apparatus 1 may include a connection part 29 for allowing the interior of the chamber 2 and the interior of the exposure apparatus 6 to be in communication with each other. A wall 291 provided with an aperture may be disposed inside the connection part 29. The wall 291 may be disposed such that the second focus of the EUV collector mirror 23 lies in the aperture formed in the wall 291.

The EUV light generation system 11 may further include a laser beam direction control unit 34, a laser beam focusing optical system 22, and a target collection unit 28 for collecting targets 27. The laser beam direction control unit 34 may include an optical element for defining the direction into which the laser beam travels and an actuator for adjusting the position and/or the posture (orientation) of the optical element.

3.2 Operation

With reference to FIG. 1, a pulsed laser beam 31 outputted from the laser apparatus 3 may pass through the laser beam direction control unit 34 and, as a pulsed laser beam 32, may travel through the window 21 and enter the chamber 2. The pulsed laser beam 32 may travel inside the chamber 2, be reflected by the laser beam focusing optical system 22, and, as a pulsed laser beam 33, strike at least one target 27.

The droplet generator 26 may output the targets 27 toward the plasma generation region 25 inside the chamber 2. The target 27 may be irradiated with at least one pulse included in the pulsed laser beam 33. The target 27 that has been irradiated with the pulsed laser beam 33 may be turned into plasma, and rays of light including EUV light 252 may be emitted from the plasma. The EUV light 252 may be reflected selectively by the EUV collector mirror 23. The EUV light 252 reflected by the EUV collector mirror 23 may travel through the intermediate focus region 292 and be outputted to the exposure apparatus 6. The target 27 may be irradiated with multiple pulses included in the pulsed laser beam 33.

The EUV light generation controller 5 may integrally control the EUV light generation system 11. The EUV light generation controller 5 may process image data of the targets 27 captured by the target sensor 4. Further, the EUV light generation controller 5 may control at least one of the timing at which the target 27 is outputted and the direction into which the target 27 is outputted, for example. Furthermore, the EUV light generation controller 5 may control at least one of the timing at which the laser apparatus 3 oscillates, the direction in which the pulsed laser beam 32 travels, and the position at which the pulsed laser beam 33 is focused. The various controls mentioned above are merely examples, and other controls may be added as necessary.

4. First Embodiment

4.1 Configuration of Laser Apparatus

Figure 2:
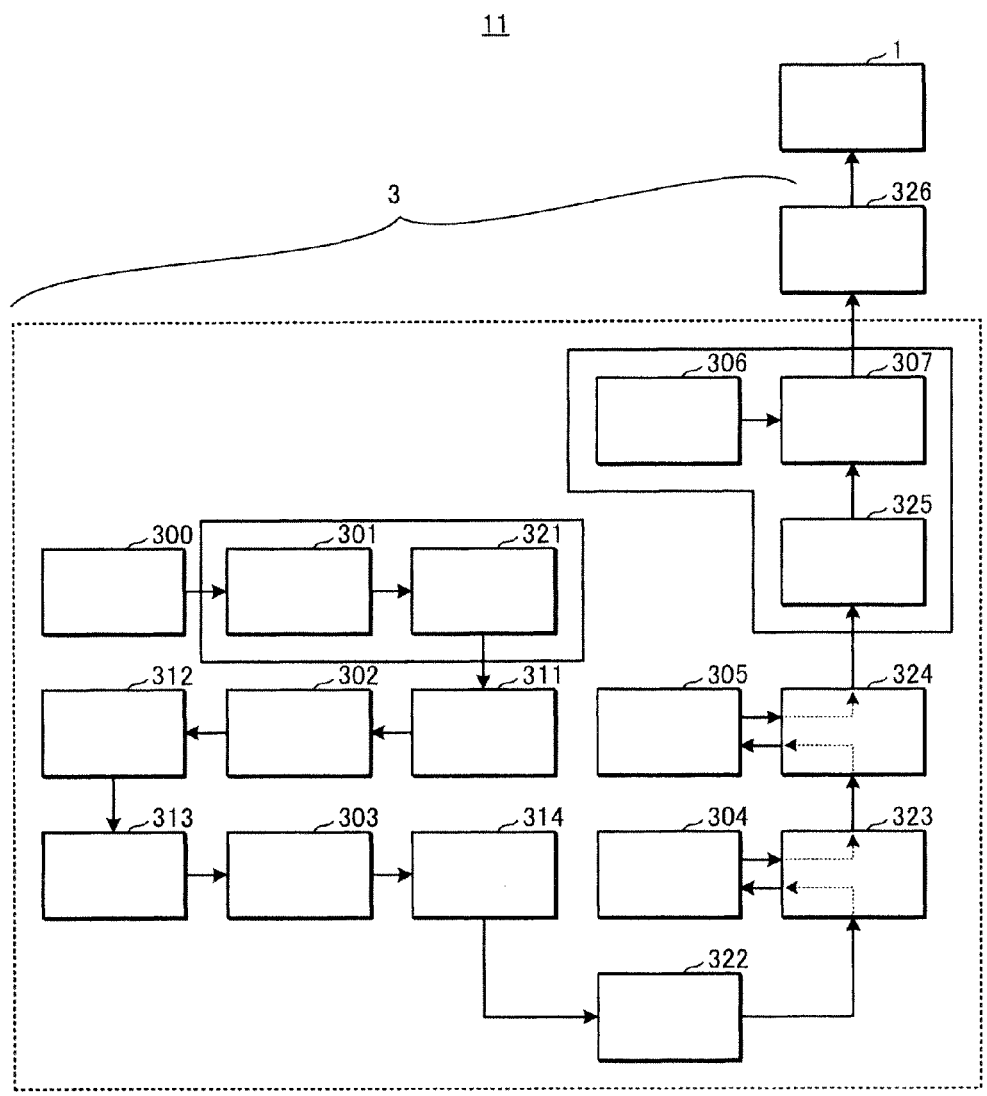
FIG. 2 is a block diagram illustrating the configuration of an EUV light generation system according to a first embodiment of the present disclosure.

FIG. 2 is a block diagram illustrating the configuration of an EUV light generation system according to a first embodiment of the present disclosure. The laser apparatus 3 included in the EUV light generation system 11 may include a master oscillator 300, first, second, and third preamplifiers 301, 302, and 303, first and second main amplifiers 304 and 305, a pre-pulse laser apparatus 306, and a beam path adjusting unit 307.

The master oscillator 300 (oscillator) may be configured of a $CO_2$ laser apparatus, for example. The master oscillator 300 may be configured to generate a seed beam of a main pulse laser beam. The main pulse laser beam may strike a target material, whereby the target material may be turned into plasma.

The first preamplifier 301, the second preamplifier 302, the third preamplifier 303, the first main amplifier 304, and the second main amplifier 305 may be disposed in this sequence downstream from the master oscillator 300. The first preamplifier 301, the second preamplifier 302, the third preamplifier 303, the first main amplifier 304, and the second main amplifier 305 may be configured to amplify the seed beam of the main pulse laser beam sequentially, and the amplified main pulse laser beam may be outputted toward the beam path adjusting unit 307. Each of the first preamplifier 301, the second preamplifier 302, and the third preamplifier 303 may be a slab amplifier, for example. Each of the first amplifier 304 and the second amplifier 305 may be a fast-axial-flow amplifier, for example.

First and second beam adjusting units (BF) 311 and 312 may be disposed respectively upstream and downstream from the second preamplifier 302. Third and fourth beam adjusting units (BF) 313 and 314 may be disposed respectively upstream and downstream from the third preamplifier 303.

A first beam delivery unit (BD) 321 may be disposed between the first preamplifier 301 and the first beam adjusting unit 311. The first beam delivery unit 321 may guide the laser beam from the first preamplifier 301 to the first beam adjusting unit 311.

Second and third beam delivery units 322 and 323 may be disposed between the fourth beam adjusting unit 314 and the first main amplifier 304. The second and third beam delivery units 322 and 323 may guide the laser beam from the fourth beam adjusting unit 314 to the first main amplifier 304.

Third and fourth beam delivery units 323 and 324 may be disposed between the first main amplifier 304 and the second main amplifier 305. The third and fourth beam delivery units 323 and 324 may guide the laser beam from the first main amplifier 304 to the second main amplifier 305.

Fourth and fifth beam delivery units 324 and 325 may be disposed between the second main amplifier 305 and the beam path adjusting unit 307. The fourth and fifth beam delivery units 324 and 325 may guide the laser beam from the second main amplifier 305 to the beam path adjusting unit 307.

The pre-pulse laser apparatus 306 may be configured to output a pre-pulse laser beam. The pre-pulse laser beam may strike a target 27 (see to FIG. 1), whereby the target 27 may be diffused. With this, the absorptivity of the main pulse laser beam by the diffused target material may be improved. The pre-pulse laser beam outputted from the pre-pulse laser apparatus 306 may enter the beam path adjusting unit 307. The main pulse laser beam and the pre-pulse laser beam that have entered the beam path adjusting unit 307 may then be outputted to the EUV light generation apparatus 1 via a sixth beam delivery unit 326.

4.2 Arrangement of Modules

Figure 3A:
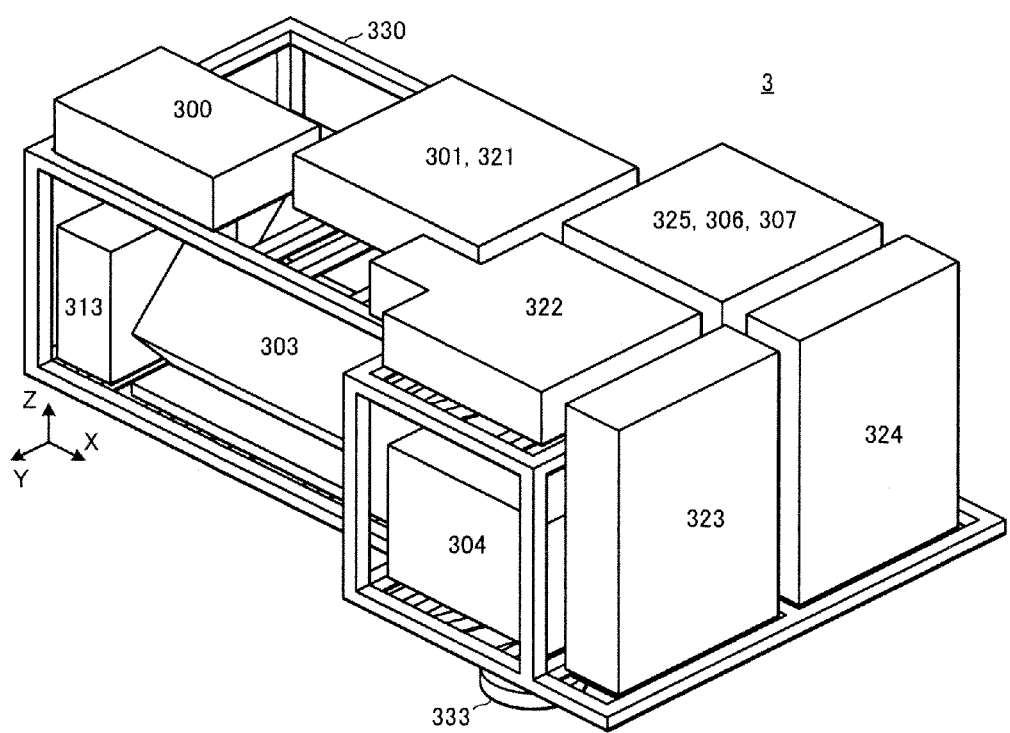
FIG. 3A is a perspective view illustrating a specific arrangement of modules constituting the laser apparatus according to the first embodiment.
Figure 3B:
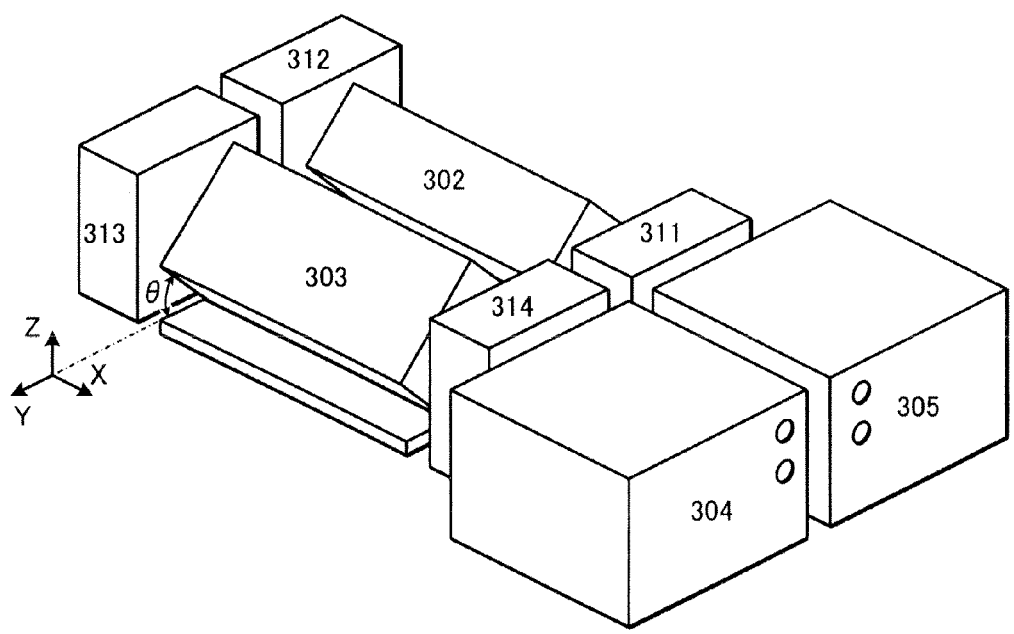
FIG. 3B is a perspective view illustrating the arrangement of the modules disposed in the lower level in FIG. 3A.
Figure 3C:
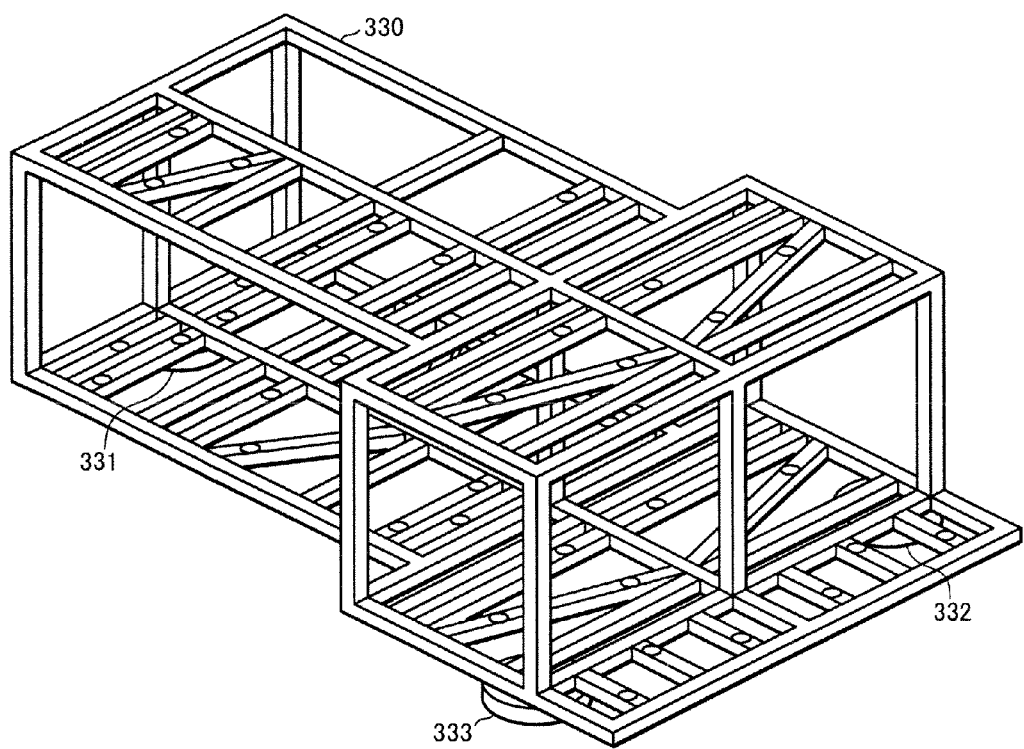
FIG. 3C is a perspective view illustrating the frame in FIG. 3A.

FIG. 3A is a perspective view illustrating a specific arrangement of the modules constituting the laser apparatus according to the first embodiment. FIG. 3B is a perspective view illustrating the arrangement of the modules disposed in the lower level in FIG. 3A. FIG. 3C is a perspective view illustrating the frame in FIG. 3A. As illustrated in FIG. 3C, the frame may be configured of a plurality of column, beams, and so forth. The master oscillator 300, the first, second, and third preamplifiers 301, 302, and 303, the first and second main amplifiers 304 and 305, the pre-pulse laser apparatus 306, the beam path adjusting unit 307, the first, second, third, and fourth beam adjusting units 311, 312, 313, and 314, and the first, second, third, fourth, and fifth beam delivery units 321, 322, 323, 324 and 325 may be supported by a frame 330. Here, the sixth beam delivery unit 326 and the EUV light generation apparatus 1 (see FIG. 2) may be disposed so as to be distanced from the modules shown in FIG. 3A; thus, the sixth beam delivery unit 326 is not depicted in FIG. 3A. In FIG. 3A, three orthogonal axes (XYZ) are defined, and this coordinate system will be used in the subsequent drawings. Here, the XY plane is the horizontal plane, and the Z-direction is opposite to the direction of gravitational force.

The frame 330 may be supported on the floor by at least three frame support units: for example, first, second, and third frame support units 331, 332, and 333. Each of the frame support units 331, 332, and 333 may be configured of an air suspension, for example.

As illustrated in FIG. 3A, the first preamplifier 301 and the first beam delivery unit 321 may be housed in a single housing. The fifth beam delivery unit 325, the pre-pulse laser apparatus 306, and the beam path adjusting unit 307 may be housed in another housing.

The master oscillator 300, the first preamplifier 301, the first beam delivery unit 321, the second beam delivery unit 322, the fifth beam delivery unit 325, the pre-pulse laser apparatus 306, and the beam path adjusting unit 307 may be disposed on the upper level of the laser apparatus 3. As illustrated in FIG. 3B, the second and third preamplifiers 302 and 303, the first and second main amplifiers 304 and 305, and the first, second, third, and fourth beam adjusting units 311, 312, 313, and 314 may be disposed on the lower level of the laser apparatus 3. In some embodiments, a total weight of the units or the modules placed in the lower (second) level may be greater than a total weight of the units or the modules placed in the upper (first) level.

The housing for the first preamplifier 301 and the first beam delivery unit 321 may be disposed adjacent to the master oscillator 300. The first beam adjusting unit 311 shown in FIG. 3B may be disposed below the housing for the first preamplifier 301 and the first beam delivery unit 321.

As illustrated in FIG. 3B, the second preamplifier 302 may be disposed adjacent to the first beam adjusting unit 311. The second beam adjusting unit 312 may be disposed adjacent to the second preamplifier 302. The third beam adjusting unit 313 may be disposed adjacent to the second beam adjusting unit 312. The third preamplifier 303 may be disposed adjacent to the third beam adjusting unit 313. The fourth beam adjusting unit 314 may be disposed adjacent to the third preamplifier 303. The second beam delivery unit 322 shown in FIG. 3A may be disposed above the fourth beam adjusting unit 314.

As illustrated in FIG. 3A, the third beam delivery unit 323 may be disposed adjacent to the second beam delivery unit 322. The first main amplifier 304 may be disposed adjacent to the third beam delivery unit 323 and below the second beam delivery unit 322. The fourth beam delivery unit 324 may be disposed adjacent to the third beam delivery unit 323. The second main amplifier 305 may be disposed adjacent to the fourth beam delivery unit 324. Further, the housing for the fifth beam delivery unit 325, the pre-pulse laser apparatus 306, and the beam path adjusting unit 307 may be disposed adjacent to the fourth beam delivery unit 324 and above the second main amplifier 305.

As illustrated in FIG. 3B, each of the second and third preamplifiers 302 and 303 may be disposed so as to be inclined by a predetermined angle θ (θ=45 degrees, for example) with respect to the horizontal plane (XY plane). The main pulse laser beam entering the preamplifier disposed so as to be inclined with respect to the horizontal plane may be elliptical in cross-section elongated substantially in the direction in which the preamplifier is inclined. Accordingly, in the first embodiment, a main pulse laser beam which is substantially circular in cross-section may be transformed into a laser beam having an elongated cross-section through the first beam adjusting unit 311. Further, the first beam adjusting unit 311 may be disposed such that the transformed main pulse laser beam having an elongated cross-section is made to enter the second preamplifier 302 in a state where the lengthwise direction of the main pulse laser beam substantially coincides with the direction in which the second preamplifier 302 is inclined.

The second beam adjusting unit 312 may be configured to transform the main pulse laser beam from the second preamplifier 302 into a laser beam which is substantially circular in cross-section. The third beam adjusting unit 313 may be configured to transform the main pulse laser beam which is substantially circular in cross-section into a laser beam having a cross-section elongated in one direction. Alternatively, the second beam adjusting unit 312 may be configured to allow the main pulse laser beam outputted from the second preamplifier 302 to enter the third beam adjusting unit 313 while retaining the main pulse laser beam to a laser beam having an elongated cross-section. At this point, the divergence, the beam profile, and so forth, of the main pulse laser beam may be adjusted. Then, the third beam adjusting unit 313 may be disposed such that the main pulse laser beam having an elongated cross-section is made to enter the third preamplifier 303 in a state where the lengthwise direction of the main pulse laser beam substantially coincides with the direction in which the third preamplifier 303 is inclined. The fourth beam adjusting unit 314 may be configured to transform the main pulse laser beam from the third preamplifier 303 into a laser beam which is substantially circular in cross-section.

The second and third preamplifiers 302 and 303 and the first and second main amplifiers 304 and 305 may be required of a greater gain for the main pulse laser beam. Thus, these apparatuses may tend to be increased in size and weight compared to the master oscillator 300 and the first preamplifier 301. Accordingly, the second and third preamplifiers 302 and 303 and the first and second main amplifiers 304 and 305 may be disposed on the lower level of the laser apparatus 3, in order to make these apparatuses more easily accessible and facilitate the maintenance work on these apparatuses.

Figure 4:
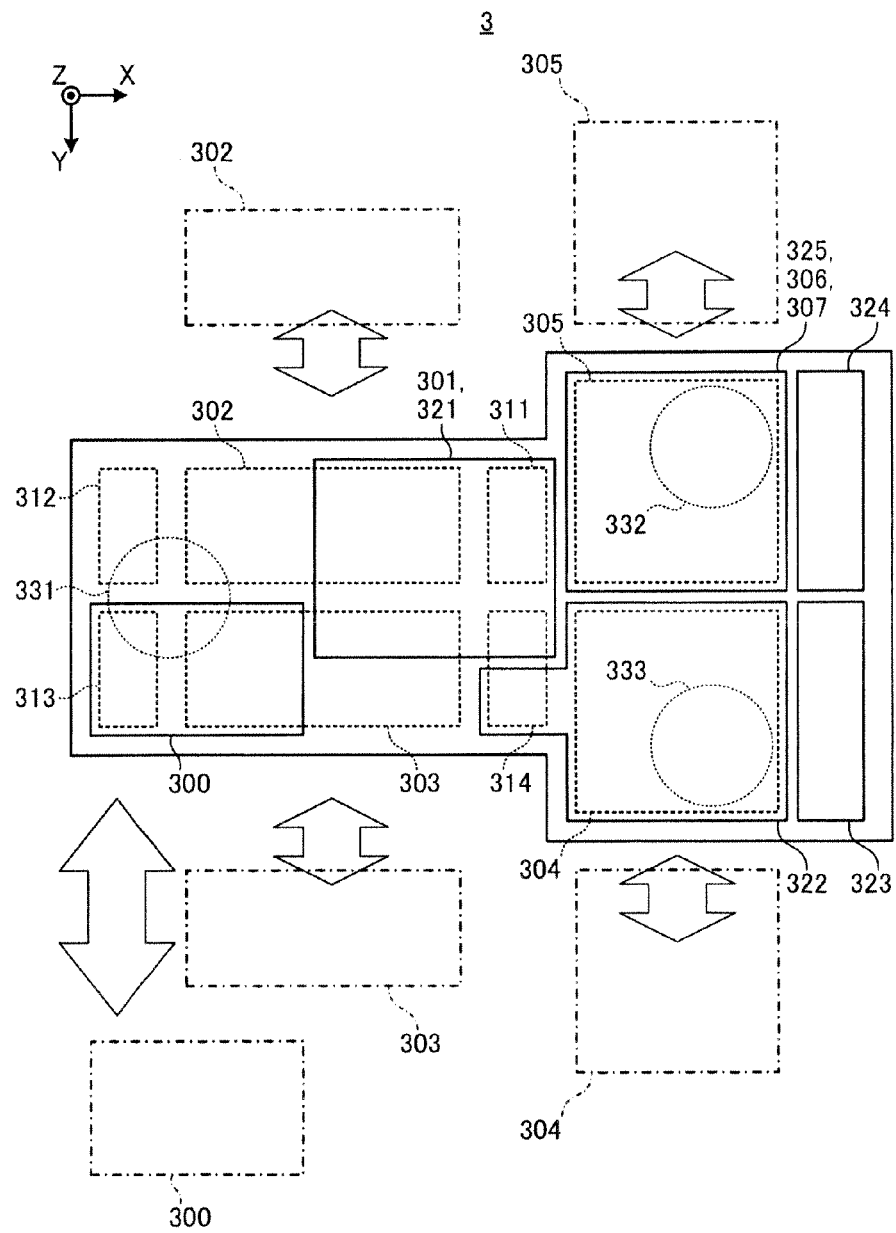
FIG. 4 is a plan view illustrating a specific arrangement of modules constituting the laser apparatus according to the first embodiment.

FIG. 4 is a plan view illustrating a specific arrangement of the modules constituting the laser apparatus according to the first embodiment. Each of the modules, such as the master oscillator 300, the first, second, and third preamplifiers 301, 302, and 303, the first and second main amplifiers 304 and 305, the pre-pulse laser apparatus 306, the beam path adjusting unit 307, the first, second, third, and fourth beam adjusting units 311, 312, 313, and 314, and the first, second, third, fourth, and fifth beam delivery units 321, 322, 323, 324, and 325, may be configured so as to be removable from the frame 330 for the maintenance work. For example, the master oscillator 300, the second and third preamplifiers 302 and 303, and the first and second main amplifiers 304 and 305 may be configured to be movable along the installation surface (along the XY plane in FIG. 4, for example). Hereinafter, the configuration for positioning these modules with respect to the frame 330 or for removing these modules from the frame 330 will be described.

4.3 Support Mechanism for Main Amplifier

Figure 5:
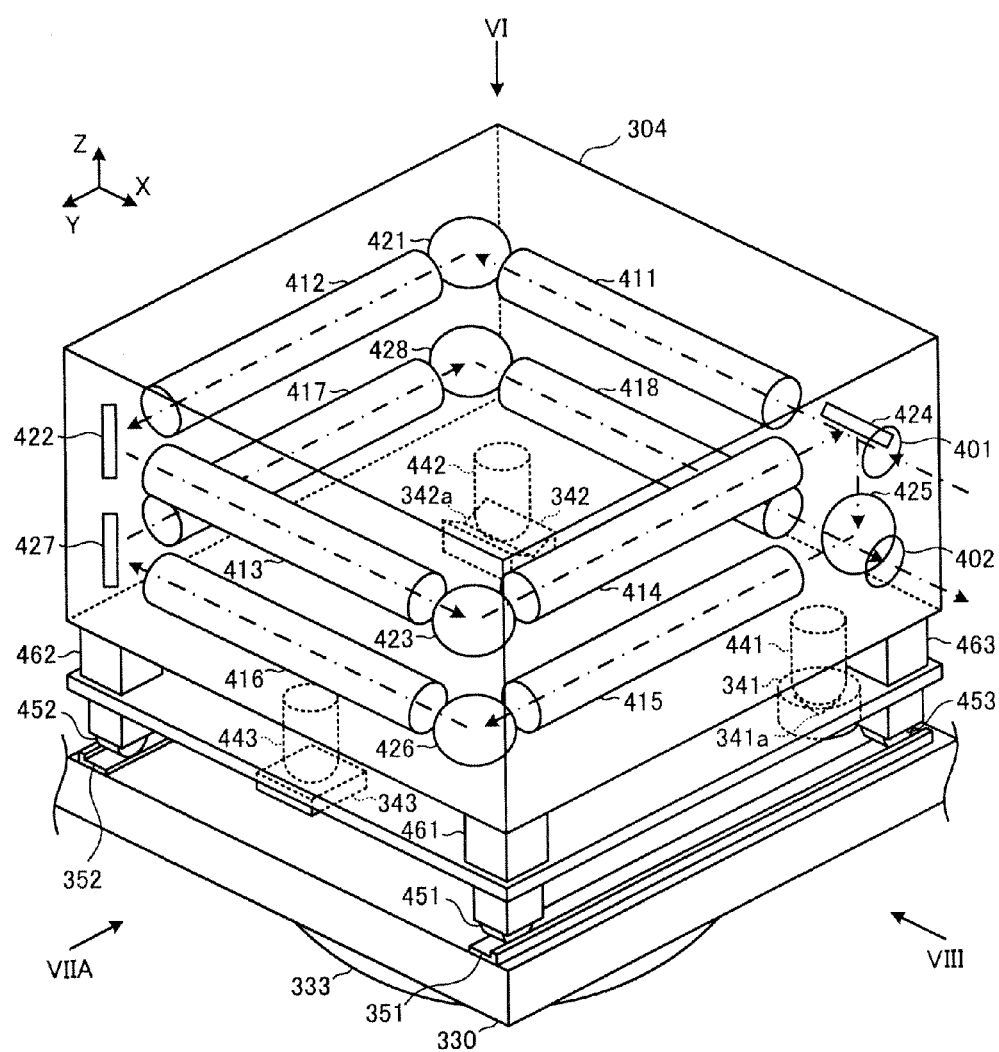
FIG. 5 is a perspective view illustrating a first main amplifier.
Figure 6:
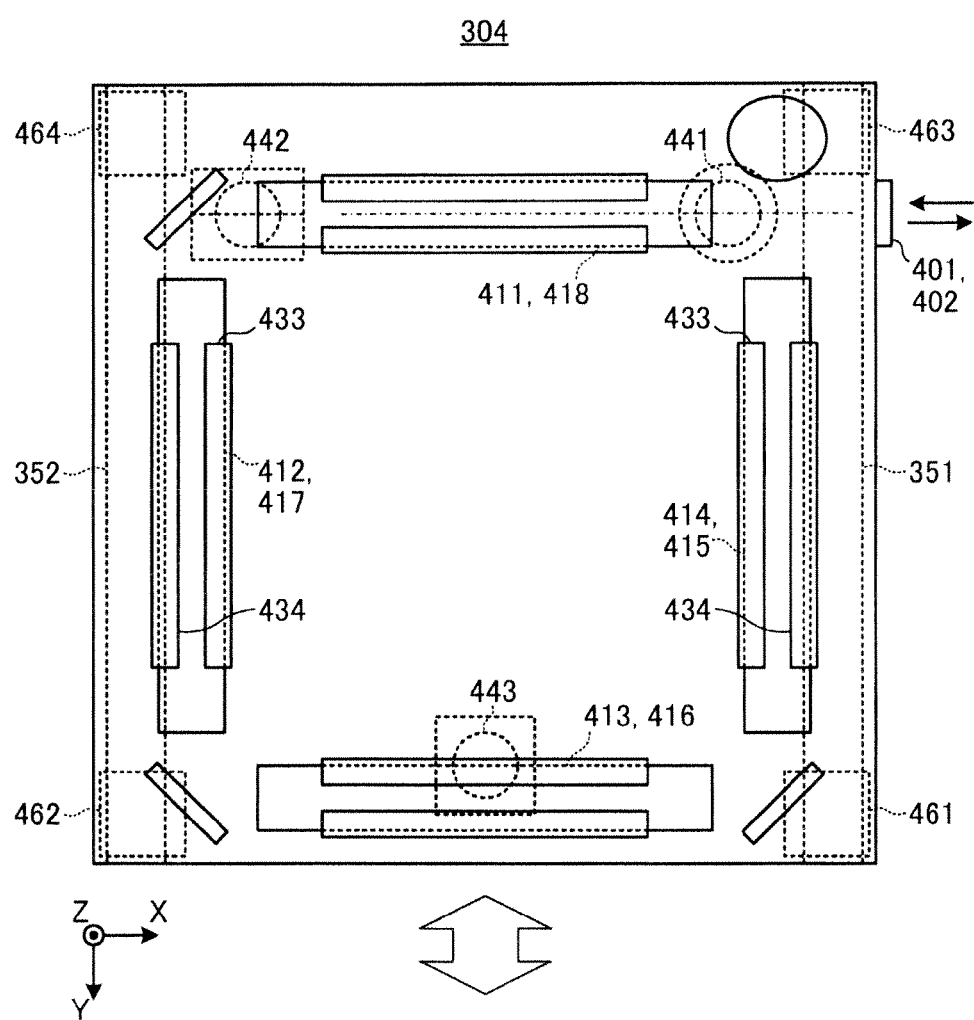
FIG. 6 is a plan view of the first main amplifier shown in FIG. 5, as viewed in the direction of an arrow VI.
Figure 7A:
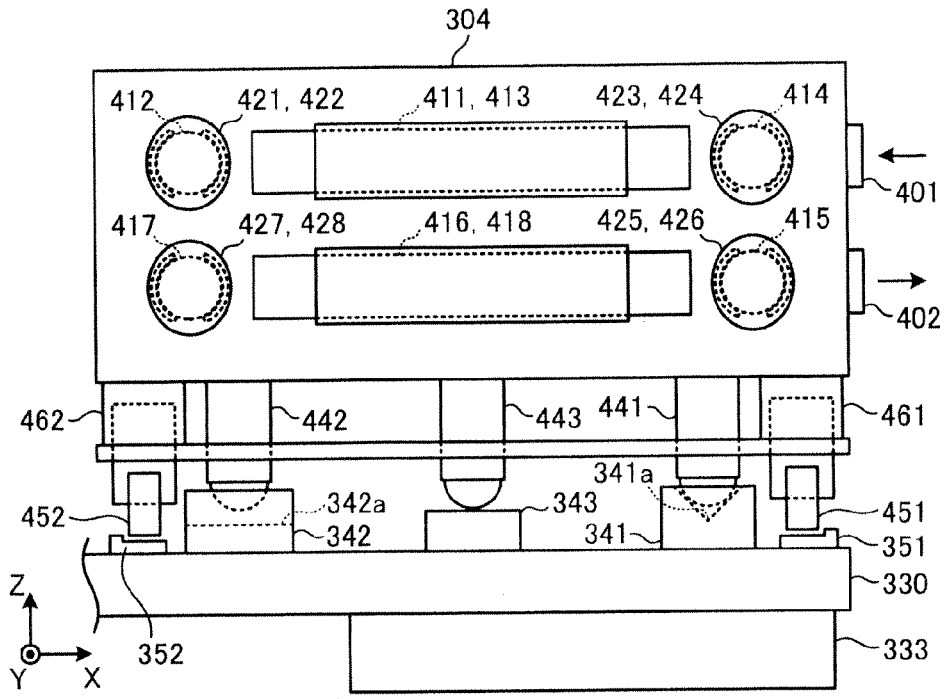
FIG. 7A is a front view of the first main amplifier shown in FIG. 5, as viewed in the direction of an arrow VIIA.
Figure 8:
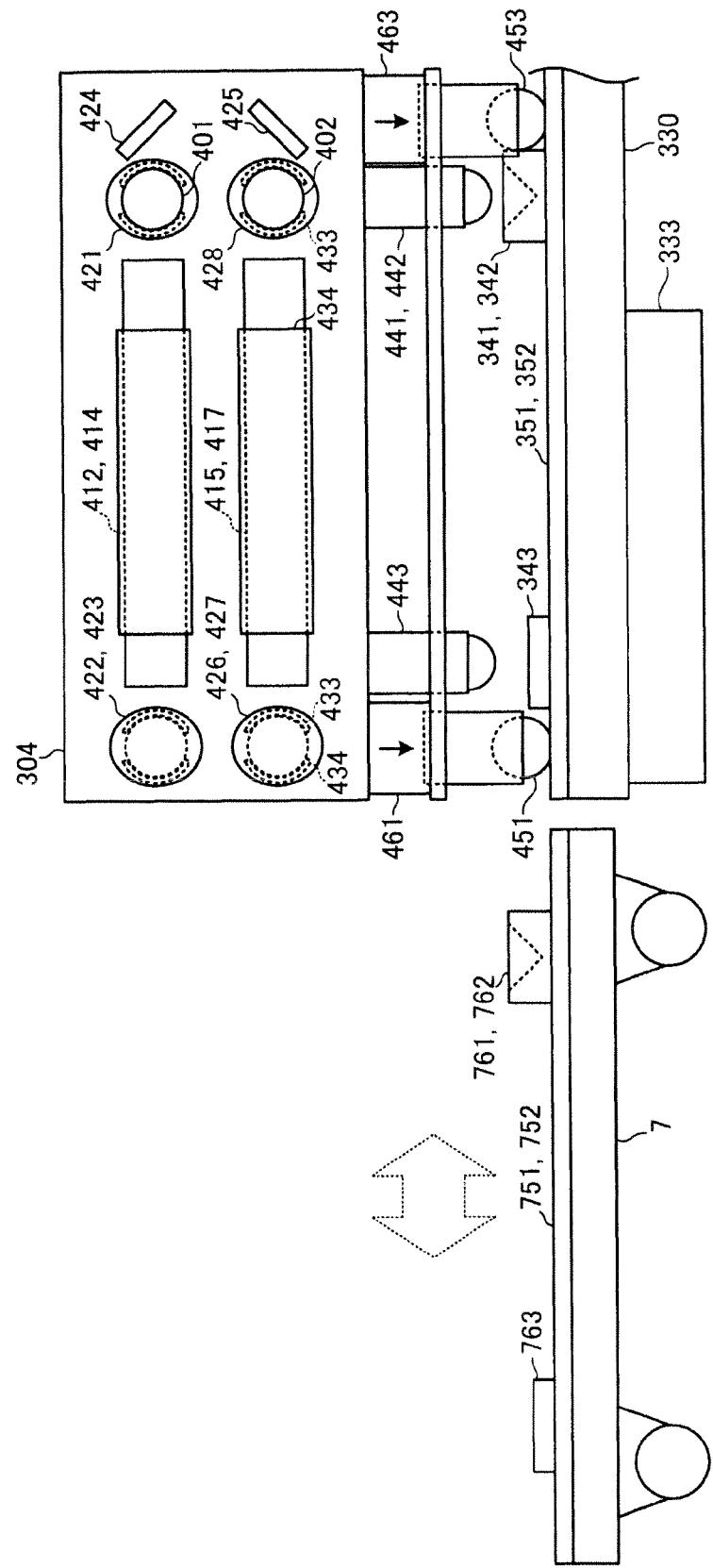
FIG. 8 is a side view of the first main amplifier shown in FIG. 5, as viewed in the direction of an arrow VIII.

FIG. 5 is a perspective view illustrating the first main amplifier. FIG. 6 is a perspective plan view of the first main amplifier shown in FIG. 5, as viewed in the direction of an arrow VI. FIG. 7A is a perspective front view of the first main amplifier shown in FIG. 5, as viewed in the direction of an arrow VIIA. FIG. 8 is a perspective side view of the first main amplifier shown in FIG. 5, as viewed in the direction of an arrow VIII.

As shown in FIGS. 5 through 8, the first main amplifier, which may constitute a single module, may, for example, be a fast-axial-flow amplifier. The fast-axial-flow amplifier may include an input window 401, discharge tubes 411, 412, 413, 414, 415, 416, 417, and 418, mirrors 421, 422, 423, 424, 425, 426, 427, and 428, and an output window 402. The input window 401 may be a transparent window, through which the laser beam from the third beam delivery unit 323 (see FIG. 3A) traveling along the X-direction may enter the fast-axial-flow amplifier. The output window 402 may be a transparent window, through which the laser beam may be outputted toward the third beam delivery unit 323 along the X-direction.

As illustrated in FIG. 6, the fast-axial-flow amplifier may include a pair of electrodes 433 and 434 disposed along the periphery of each of the discharge tubes 411, 412, 413, 414, 415, 416, 417, and 418. Further, a mixed gas containing $CO_2$ gas as the laser medium may be supplied into each of the discharge tubes 411, 412, 413, 414, 415, 416, 417, and 418.

In each of the discharge tubes 411, 412, 413, 414, 415, 416, 417, and 418, high-frequency voltage may be applied between the electrodes 433 and 434 by an RF power source (not shown). With this, the mixed gas containing $CO_2$ gas may be excited, and the laser beam traveling in the region with the excited mixed gas may be amplified. The laser beam may enter the discharge tube 411 through the input window 401, and be reflected by the respective mirrors 421, 422, 423, 424, 425, 426, 427, and 428 (see FIG. 5) so as to travel sequentially inside the discharge tubes 412, 413, 414, 415, 416, 417, and 418. With this, the laser beam may be amplified, and the amplified laser beam may be outputted through the output window 402 along the X-direction.

The first main amplifier 304 may further include leg portions (support portions) 441, 442, and 443 provided on the bottom surface of the first main amplifier 304. The leg portions may be provided at least in three points, and may support the first main amplifier 304 at three points. Preferably, the support portion 441 may be provided toward the side opposite to the side on which the input window 401 and the output window 402 are provided. The leg portion 422 may be provided to the side into which the laser beam entering the first main amplifier 304 through the input window 401 travels. Further, the leg portion 443 may be provided toward the side opposite to the side along which the leg portions 441 and 442 are provided.

As illustrated in FIG. 7A, the frame 330 may include mounts 341, 342, and 343, on which the leg portions 441, 442, and 443 are placed, respectively. The leg portions 441, 442, and 443 may be placed on the respective mounts 341, 342, and 343, whereby the first main amplifier 304 may be supported by the frame 330.

A conical recess 341a may be formed on the upper surface of the mount 341. A V-shaped groove 342a may be formed on the upper surface of the mount 342. The groove 342a may be formed in a direction parallel to the direction into which the laser beam entering through the input window 401 travels and also the direction into which the laser beam to be outputted through the output window 402 travels (X-direction). The upper surface of the mount 343 may be planar.

The leg portion 441 may be placed on the mount 341, whereby the movement of the leg portion 441 along the XY plane may be restricted. The leg portion 442 may be placed on the mount 342, whereby the leg portion 442 may be supported so as to be movable in the direction along the groove 342a. That is, the leg portion 442 may be supported so as to be movable in the direction parallel to direction into which the laser beam entering through the input window 401 travels and also the direction into which the laser beam to be outputted through the output window 402 travels. The leg portion 443 may be placed on the mount 343, whereby the leg portion 443 may be supported so as to be movable along the upper surface of the mount 343. That is, the leg portion 443 may be supported so as to be movable along the horizontal plane.

As illustrated in FIG. 6, the leg portions 441 and 442 may be provided on the bottom surface of the first main amplifier 304 along an extension of the axes of the laser beam entering through the input window 401 and of the laser beam to be outputted through the output window 402. The leg portion 441 may be provided toward the side on which the input window 401 and the output window 402 are provided, and may serve to position the first main amplifier 304 with respect to the frame 330.

With the above configuration, even when the first main amplifier 304 undergoes thermal deformation, spatial displacement of the input window 401 and the output window 402 may be suppressed. Further, the above configuration may suppress the relative displacement of the direction into which the laser beam outputted from the first main amplifier 304 with respect to the direction into which the laser beam enters the first main amplifier 304.

As illustrated in FIGS. 6 and 7A, the first main amplifier 304 may be provided with a plurality of extension mechanisms (lifting mechanisms) 461, 462, 463, and 464, and the extension mechanisms 461, 462, 463, and 464 may be provided with wheels (guide followers) 451, 452, 453, and 454, respectively. Here, in FIG. 7A, the extension mechanisms 463 and 464 and the wheels 453 and 454 provided thereon, respectively, may be hidden behind the extension mechanisms 461 and 462 and the wheels 451 and 452, and thus are not depicted in the drawing. The frame 330 may be provided with two rails (guides) 351 and 352, which are disposed parallel to each other. With the above configuration, the extension mechanisms 461, 462, 463, and 464 may be extended, whereby the first main amplifier 304 may be brought into a state shown in FIGS. 7B and 8.

Figure 7B:
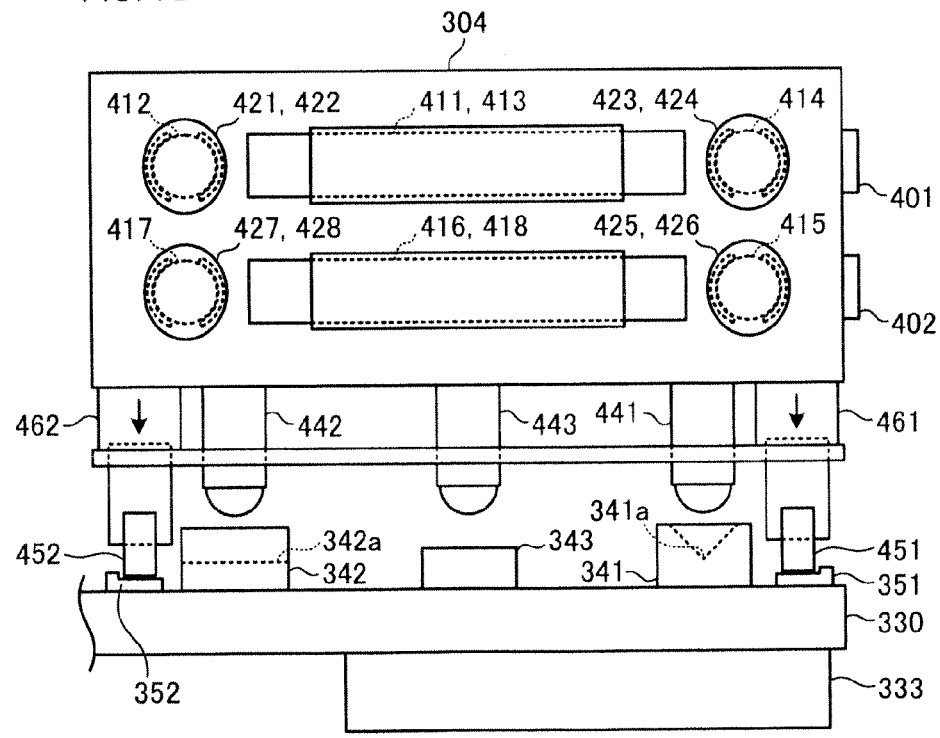
FIG. 7B is a front view illustrating the main amplifier in a state where the extension mechanism is extended.

FIG. 7B is a front view illustrating the main amplifier in a state where the leg portions 441, 442, and 443 are distanced from the frame 330 by extending the extension mechanisms 461, 462, 463, and 464. The distance between the main amplifier 304 and the wheels 451, 452, 453, and 454 may be increased by extending the extension mechanisms 461, 462, 463, and 464, whereby the leg portions anchored to the first main amplifier 304 may be distanced from the mounts 341, 342, and 343 anchored to the frame 330. With this, the wheels 451, 452, 453, and 454 may be allowed to travel along the rails 351 and 352, whereby the first main amplifier 304 may be moved with respect to the frame 330.

Further, as illustrated in FIG. 8, a carriage 7 may be arranged near the frame 330. The carriage 7 may be provided with two rails 751 and 752, which are disposed parallel to each other, for example. With this, the first main amplifier 304 may be removed from the frame 330 onto the carriage 7 and be transported to a desired maintenance area.

Further, the carriage 7 may be provided with mounts 761, 762, and 763, which are arranged similarly to the mounts 341, 342, and 343. The mounts 761, 762, and 763 may be arranged such that the first main amplifier 304 may be positioned with respect to the carriage 7. The wheels 451, 452, 453, and 454 may be made to travel along the rails 751 and 752, whereby the first main amplifier 304 may be moved onto the carriage 7 such that the leg portions 441, 442, and 443 are positioned above the respective mounts 761, 762, and 763. Contracting the extension mechanisms 461, 462, 463, and 464 under this condition may bring the wheels 451, 452, 453, and 454 closer to the first main amplifier 304. With this, the leg portions 441, 442, and 443 may be placed on the respective mounts 761, 762, and 763, and the first main amplifier 304 may be placed stably on the carriage 7.

4.4 Support Mechanism for Preamplifier

Figure 9A:
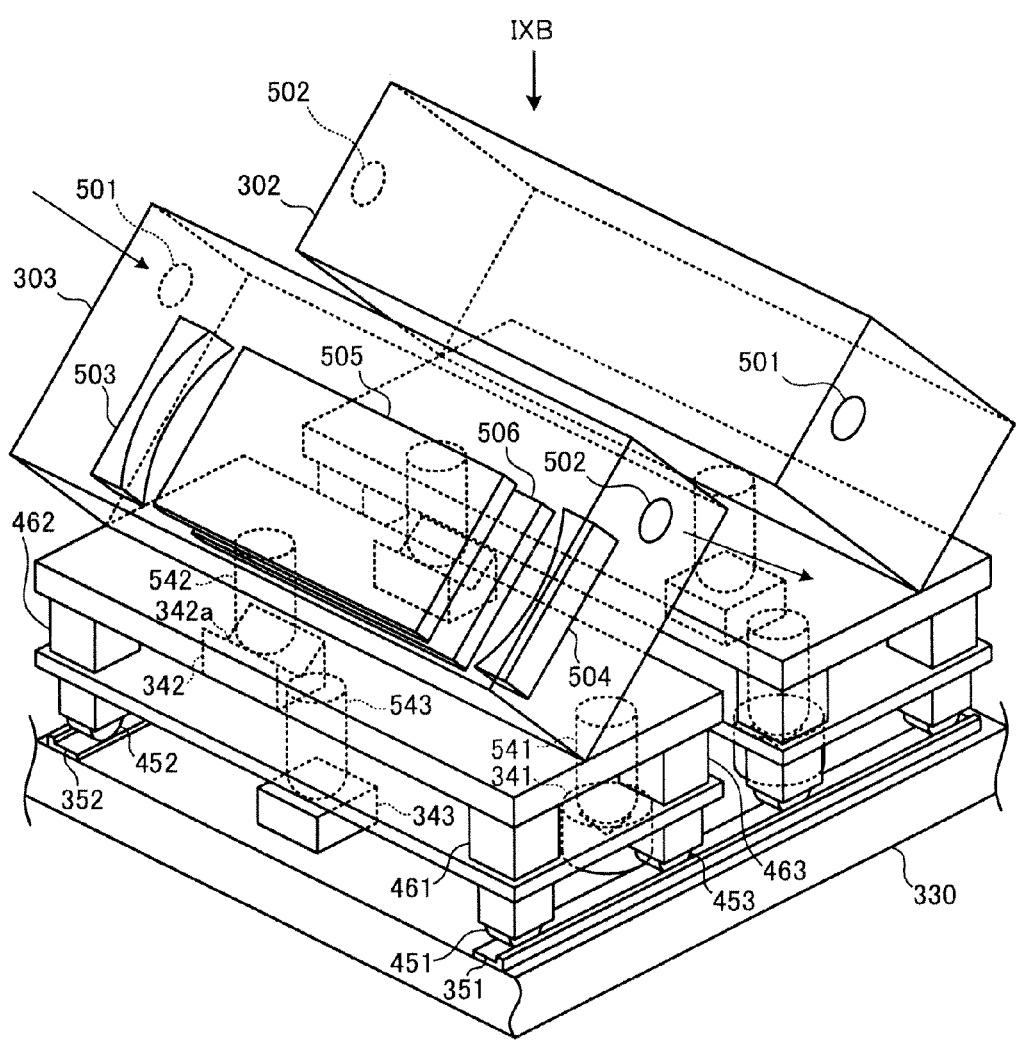
FIG. 9A is a perspective view of second and third preamplifiers.
Figure 9B:
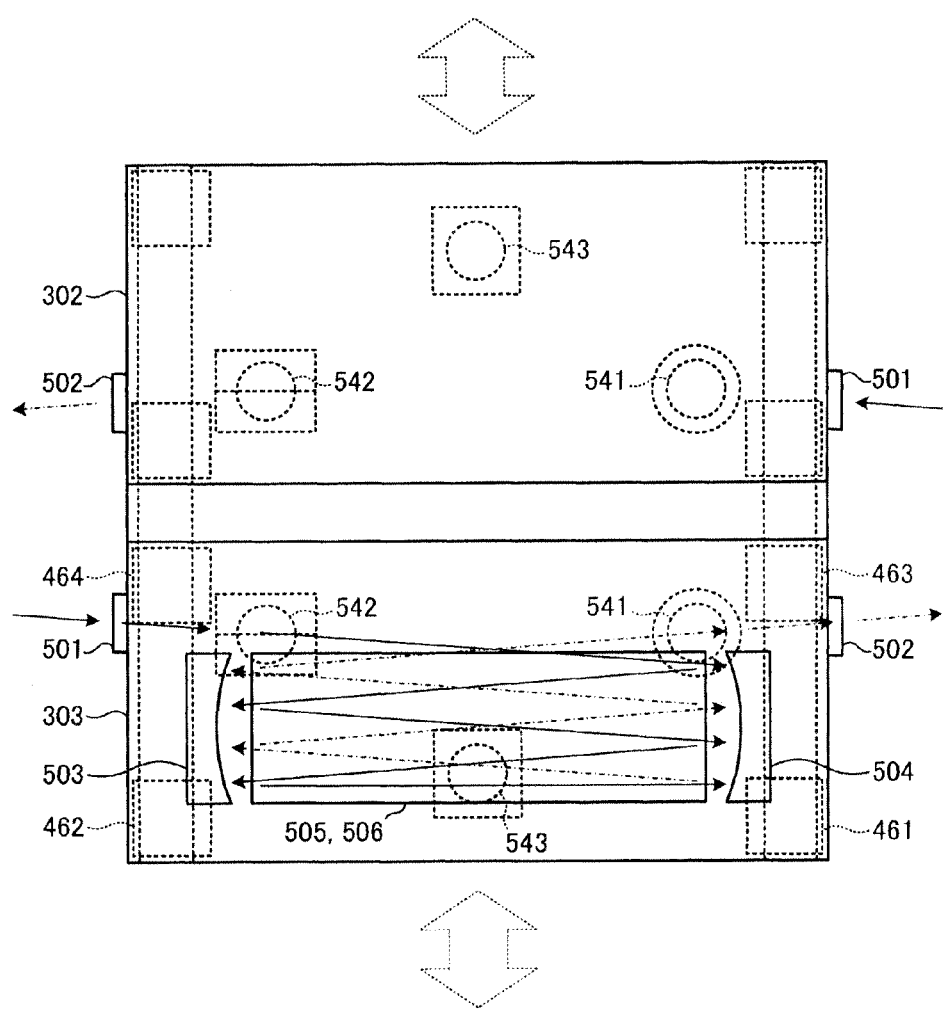
FIG. 9B is a plan view of the second and third preamplifiers shown in FIG. 9A, as viewed in the direction of an arrow IXB.

FIG. 9A is a perspective view of the second and third preamplifiers. FIG. 9B is a plan view of the second and third preamplifiers shown in FIG. 9A, as viewed in the direction of an arrow IXB. In FIGS. 9A and 9B, the third preamplifier 303 is depicted in a perspective view, and the interior of the second preamplifier 302 is not depicted; however, these preamplifiers may be similar to each other in configuration.

The third preamplifier 303, which may constitute a single module, may be, for example, a slab amplifier. The slab amplifier may include an input window 501, an output window 502, a pair of concave mirrors 503 and 504, and a pair of discharge electrodes 505 and 506.

The input window 501 may be a transparent window through which the laser beam from the third beam adjusting unit 313 (see FIG. 3B) may enter the slab amplifier. The output window 502 may be a transparent window, through which a laser beam is outputted toward the fourth beam adjusting unit 314. High voltage may be applied between the discharge electrodes 505 and 506 by a power source (not shown). A laser chamber (not shown) filled with a gaseous laser medium may be disposed between the discharge electrodes 505 and 506, the laser chamber isolating the laser medium from the atmosphere.

The pair of concave mirrors 503 and 504 may be disposed so as to reflect the laser beam and allow the laser beam to travel in a zigzag manner in a region between the discharge electrodes 505 and 506, whereby a multipass beam path may be formed. The gaseous laser medium may be excited as high voltage is applied between the discharge electrodes 505 and 506. The main pulse laser beam entering through the input window 501 may be reflected by the concave mirrors 503 and 504, to thereby travel in a zigzag manner through the region filled with the excited laser medium, be amplified, and be outputted through the output window 502. The direction in which the laser beam enters the slab amplifier through the input window 501 may substantially coincide with the direction in which the laser beam is outputted from the slab amplifier through the output window 502.

As in the first main amplifier 304 described with reference to FIGS. 5 through 8, the third preamplifier 303 may further include leg portions 541, 542, and 543 provided on the bottom surface thereof. The leg portion 541 may be provided toward the side on which the output window 502 is provided. The leg portion 542 may be provided toward the side on which the input window 501 is provided. The leg portion 543 may be provided toward the side opposite to the side along which the leg portions 541 and 542 are provided.

The frame 330 may include the mounts 341, 342, and 343, on which the leg portions 541, 542, and 543 are placed, respectively. The configuration of the mounts 341, 342, and 343 may be similar to the configuration described with reference to FIGS. 5 through 8. Here, the groove 342a of the mount 342 may be formed in the direction substantially coinciding with the direction in which the laser beam entering through the input window 501 travels and also with the direction in which the laser beam to be outputted through the output window 502 travels. Note that the placement of the mounts 341 and 342 may be switched.

As illustrated in FIG. 9B, the leg portions 541 and 542 may be provided on the bottom surface of the third preamplifier 303 along an extension of axes of the laser beam to be outputted through the output window 502 and of the laser beam entering through the input window 501. With the above configuration, even when the third preamplifier 303 undergoes thermal deformation, spatial displacement of the input window 501 and the output window 502 may be suppressed. Further, the above configuration may suppress the relative displacement of the direction into which the laser beam outputted from the third preamplifier 303 travels with respect to the direction into which the laser beam entering the third preamplifier 303 travels.

As illustrated in FIG. 9A, the third preamplifier 303 may be provided with the extension mechanisms 461, 462, 463, and 464, and the extension mechanisms 461, 462, 463, and 464 may be provided with the wheels 451, 452, 453, and 454, respectively. The frame 330 may be provided with two rails 351, 352, which are disposed parallel to each other. The configuration of these constituent elements may be similar to the configuration described with reference to FIGS. 5 through 8. Further, as in the configuration described with reference to FIG. 8, the third preamplifier 303 may be made transportable while being placed on a carriage.

4.5 Support Mechanism for Beam Delivery Unit

Figure 10A:
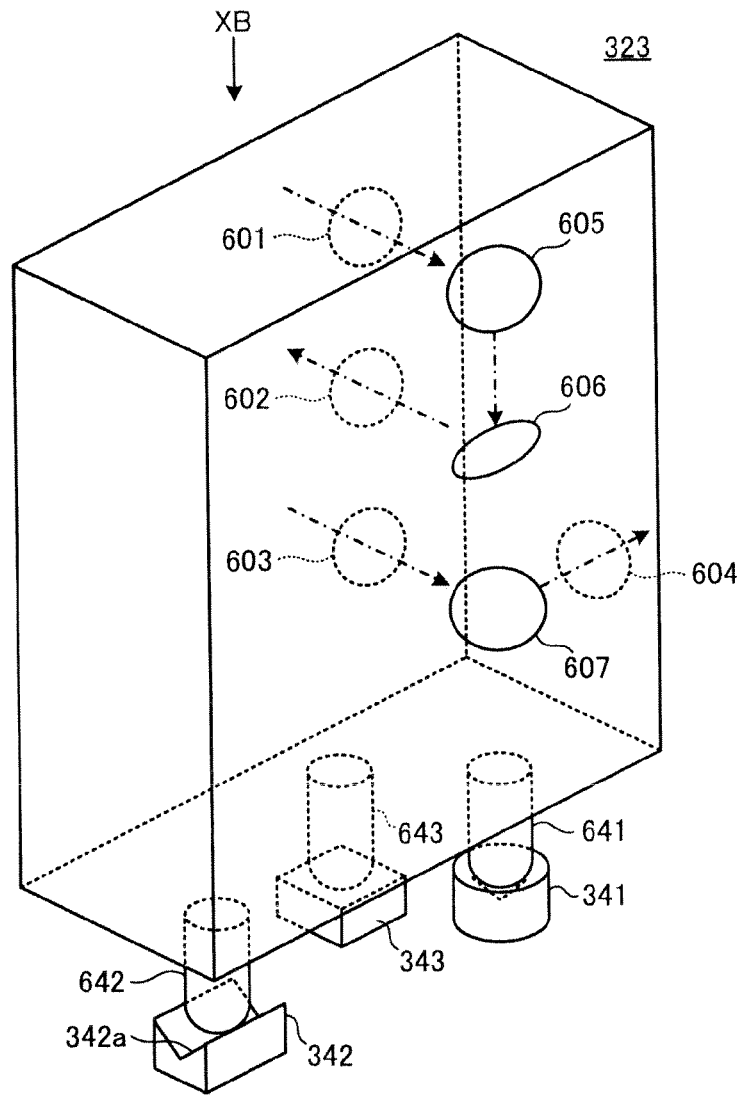
FIG. 10A is a perspective view of a third beam delivery unit.
Figure 10B:
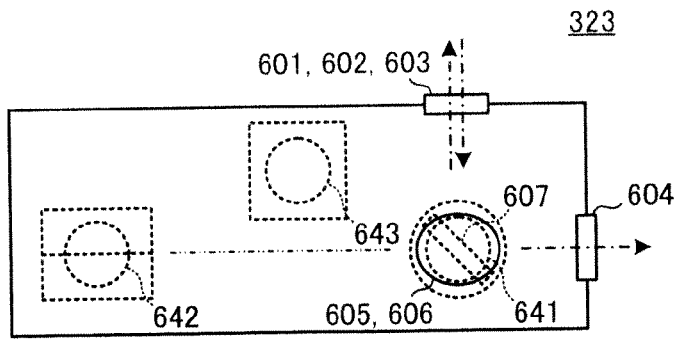
FIG. 10B is a plan view of the third beam delivery unit shown in FIG. 10A, as viewed in the direction of an arrow XB.

FIG. 10A is a perspective view of the third beam delivery unit. FIG. 10B is a plan view of the third beam delivery unit shown in FIG. 10A, as viewed in the direction of an arrow XB.

The third beam delivery unit 323, which may constitute a single module, may include a first input window 601, a first output window 602, a second input window 603, a second output window 604, and first, second, and third high-reflection mirrors 605, 606, and 607.

The input window 601 may be a transparent window, through which a laser beam from the second beam delivery unit 322 (see FIG. 3A) may enter the third beam delivery unit 323. The first output window 602 may be a transparent window, through which a laser beam is outputted toward the first main amplifier 304. The second input window 603 may be a transparent window, through which a laser beam from the first main amplifier 304 enters the third beam delivery unit 323. The second output window 604 may be a transparent window, through which a laser beam is outputted toward the fourth beam delivery unit 324.

The first and second high-reflection mirrors 605 and 606 may be disposed so as to reflect the main pulse laser beam entering through the first input window 601 and output the reflected main pulse laser beam through the first output window 602. The third high-reflection mirror 607 may be disposed so as to reflect the main pulse laser beam entering through the second input window 603 and output the reflected main pulse laser beam through the second output window 604.

The direction in which the laser beam entering through the first input window 601 travels, the direction in which the laser beam to be outputted through the first output window 602 travels, and the direction in which the laser beam entering through the second input window 603 travels may be substantially parallel to one another. The direction in which the laser beam entering through the second input window 603 travels and the direction in which the laser beam to be outputted through the second output window 604 travels may be substantially perpendicular to each other. In this way, the first, second, and third high-reflection mirrors 605, 606, and 607 may be disposed such that the laser beam may be incident on and reflected by the respective mirrors at 45 degrees.

As in the first main amplifier 304 described with reference to FIGS. 5 through 8, the third beam delivery unit 323 may further include leg portions 641, 642, and 643 provided on the bottom surface thereof. The leg portion 641 may be provided below a point where an extension of an axis of the laser beam entering through the second input window 603 intersects with an extension of an axis of the laser beam to be outputted through the second output window 604. For example, the leg portion 641 may be provided below the high-reflection mirror 607. The leg portion 642 may be provided toward the side opposite to the side on which the second output window 604 is provided, along an extension of an axis of the laser beam to be outputted through the second output window 604. The leg portion 643 may be provided to the side opposite to the side along which the leg portions 641 and 642 are provided.

The frame 330 (see FIG. 3A) may include the mounts 341, 342, and 343, on which the leg portions 641, 642, and 643 may be placed, respectively. The configuration of the mounts 341, 342, and 343 may be similar to the configuration described with reference to FIGS. 5 through 8. Further, the groove 342a of the mount 342 may be formed in the direction parallel to the direction into which the laser beam to be outputted through the second output window 604 travels.

As in the configuration described with reference to FIGS. 5 through 8, the third beam delivery unit 323 may be provided with the extension mechanisms and the wheels. Further, as in the configuration described with reference to FIG. 8, the third beam delivery unit 323 may be configured to be transportable while being placed on a carriage. The transportation mechanism does not need to be provided when the third beam delivery unit 323 is light enough to be portable.

Here, an embodiment in which the beam delivery unit may be provided with the windows 601, 602, 603, and 604, through which the laser beam enters or is outputted from the beam delivery unit. When the installation space of the laser apparatus 3 is retained in a sufficiently clean state, through-holes, in place of the windows, may be provided at the positions corresponding to the above windows through which the laser beam travels. Further, regardless of the presence of the windows, tubes through which the laser beam travels may be disposed between the beam delivery unit and other modules for safety reasons.

4.6 Support Mechanism for Master Oscillator

Figure 11A:
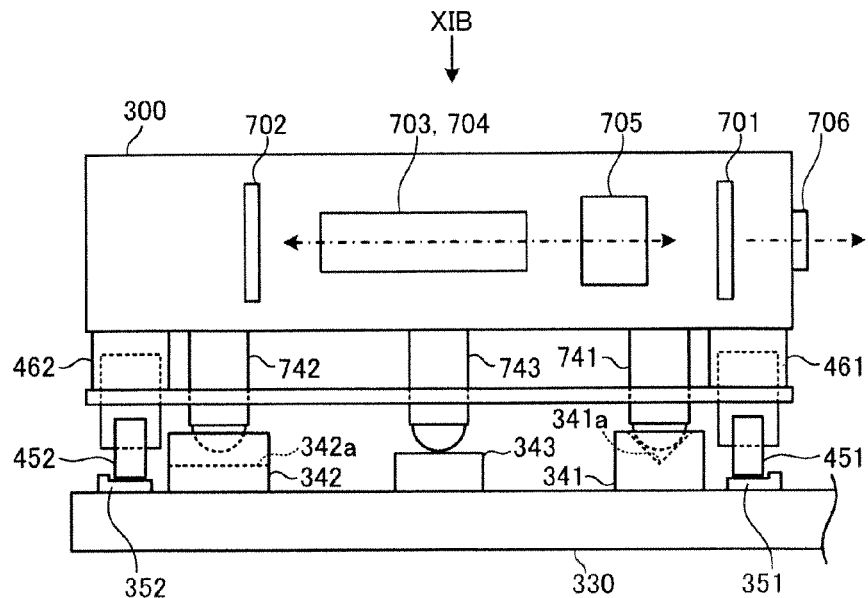
FIG. 11A is a front view of a master oscillator.
Figure 11B:
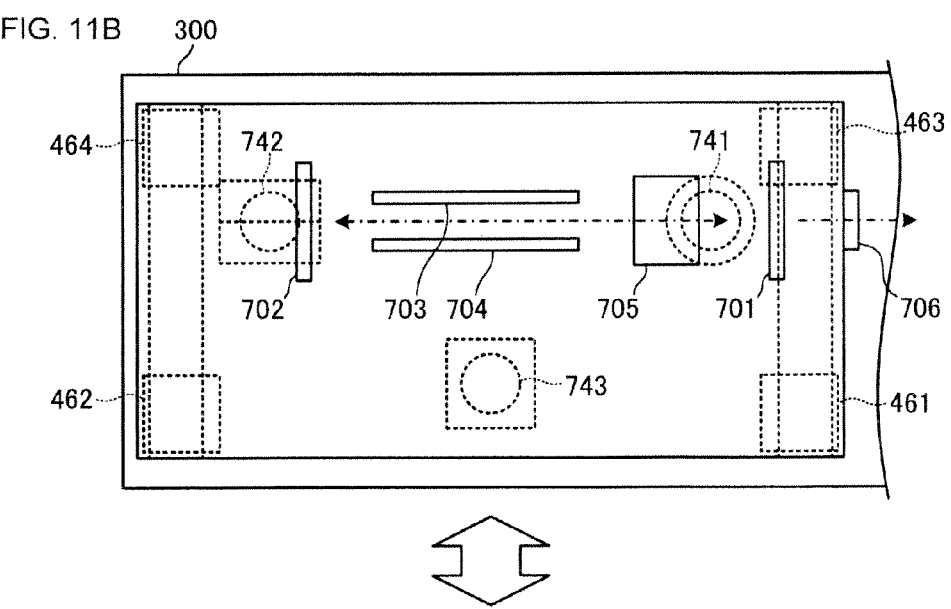
FIG. 11B is a plan view of the master oscillator shown in FIG. 11A, as viewed in the direction of an arrow XIB.

FIG. 11A is a perspective front view of the master oscillator. FIG. 11B is a perspective plan view of the master oscillator shown in FIG. 11A, as viewed in the direction of an arrow XIB.

The master oscillator 300, which may constitute a single module, may include an output coupler 701, a high-reflection mirror 702, a pair of discharge electrodes 703 and 704, a Q-switch 705, and an output window 706.

The output window 706 may be a transparent window through which the laser beam is outputted toward the first preamplifier 301 (see FIG. 3A). High voltage may be applied between the discharge electrodes 703 and 704 by a power source (not shown). A laser chamber (not shown) filled with a gaseous laser medium may be disposed between the discharge electrodes 703 and 704, the laser chamber isolating the laser medium from the atmosphere.

When high voltage is applied between the discharge electrode 703 and the discharge electrode 704 by a power source, an electric discharge may occur between the discharge electrode 703 and the discharge electrode 704. With the energy from this discharge, the laser medium may be excited and may transition to a higher energy level. When the excited laser medium makes a transition back to a lower energy level, light corresponding to the difference in the energy levels may be emitted.

The light emitted from the excited laser medium may travel back and forth between the output coupler 701 and the high-reflection mirror 702, which collectively constitute an optical resonator, and be amplified every time the light travels in a region between the discharge electrode 703 and the discharge electrode 704 (laser gain region). The Q-switch 705 may be configured to suppress oscillation while retaining a state in which an optical loss is large until a large portion of atoms constituting the laser medium is excited, and to reduce the optical loss when the large portion of atoms constituting the laser medium is excited. Providing the Q-switch 705 may allow the laser beam to be generated in pulses. A part of the pulsed laser beam amplified to a high energy level may be outputted through the output coupler 701. The pulsed laser beam outputted through the output coupler 701 may be outputted toward the first preamplifier 301 via the output window 706.

As in the first main amplifier 304 described with reference to FIGS. 5 through 8, the master oscillator 300 may further include leg portions 741, 742, and 743 provided on the bottom surface thereof. The leg portion 741 may be provided toward the side on which the output window 706 is provided. The leg portion 742 may be provided to the side opposite to the side on which the output window 706 is provided. Alternatively, the leg portion 741 may be provided below the output coupler 701, and the leg portion 742 may be provided below the high-reflection mirror 702. The leg portion 743 may be provided to the side opposite to the side along which the leg portions 741 and 742 are provided.

The frame 330 may include the mounts 341, 342, and 343, on which the leg portions 741, 742, and 743 may be placed, respectively. The configuration of the mounts 341, 342, and 343 may be similar to the configuration described with reference to FIGS. 5 through 8. Here, the groove 342a of the mount 342 may be formed in the direction parallel to the direction into which the laser beam to be outputted through the output window 706 travels.

As illustrated in FIG. 11B, the leg portions 741 and 742 may be provided along an extension of an axis of the laser beam to be outputted through the output window 706. The leg portion 741 may be provided to the side on which the output window 706 is provided, to thereby serve to position the master oscillator 300 with respect to the frame 330.

With the above configuration, even when the master oscillator 300 undergoes thermal deformation, displacement of the direction into which the laser beam to be outputted through the output 706 travels may be suppressed.

The master oscillator 300 may be provided with the extension mechanisms 461, 462, 463, and 464 and the wheels 451, 452, 453, and 454. The frame 330 may be provided with the two rails 351 and 352, which are disposed parallel to each other. The configuration of these constituent elements may be similar to the configuration described with reference to FIGS. 5 through 8.

5. Second Embodiment

Figure 12:
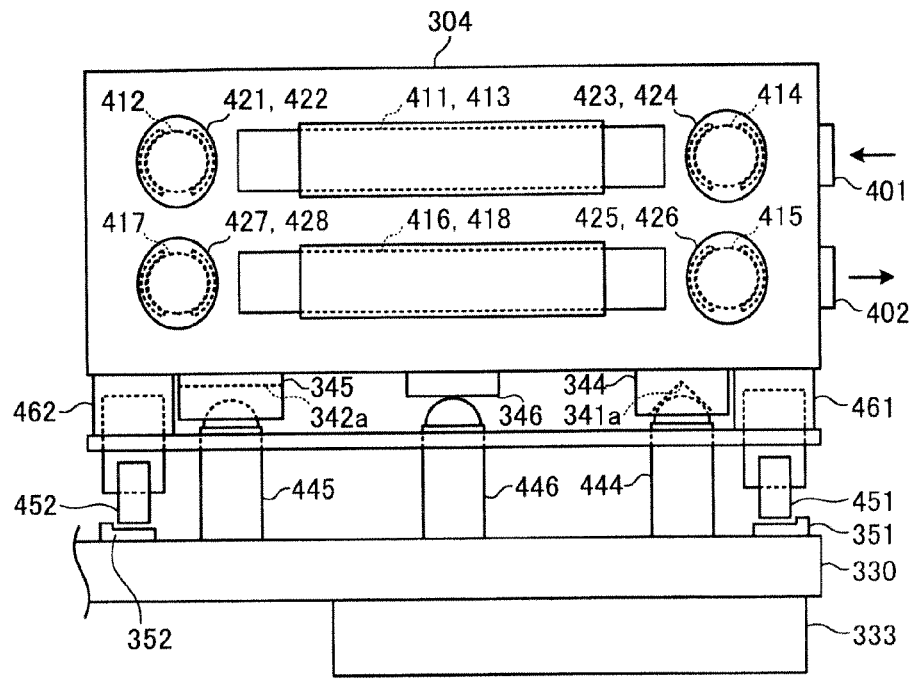
FIG. 12 is a front view of a first main amplifier according to a second embodiment of the present disclosure.

FIG. 12 is a perspective front view of a first main amplifier according to a second embodiment of the present disclosure. In the second embodiment, the first main amplifier 304 may include support portions 344, 345, and 346. The conical recess 341a may be formed on the bottom surface of the support portion 344. The V-shaped groove 342a may be formed on the bottom surface of the support portion 345. The groove 342a may be formed in the direction parallel to the direction into which the laser beam entering through the input window 401 travels and the direction into which the laser beam to be outputted through the output window 402 travels. The bottom surface of the support portion 346 may be planar.

Meanwhile, the frame 330 may include leg portions (mounts) 444, 445, and 446, on which the support portions 344, 345, and 346 may be placed, respectively. The leg portions 444, 445, and 446 may be formed so as to project upward from the upper surface of the bottom part of the frame 330.

In this way, the second embodiment may differ from the first embodiment described with reference to FIG. 7A in that the relationship between the support portions and the mounts is reversed. Other points may be similar to those of the first embodiment described with reference to FIG. 7A.

6. Third Embodiment

Figure 13:
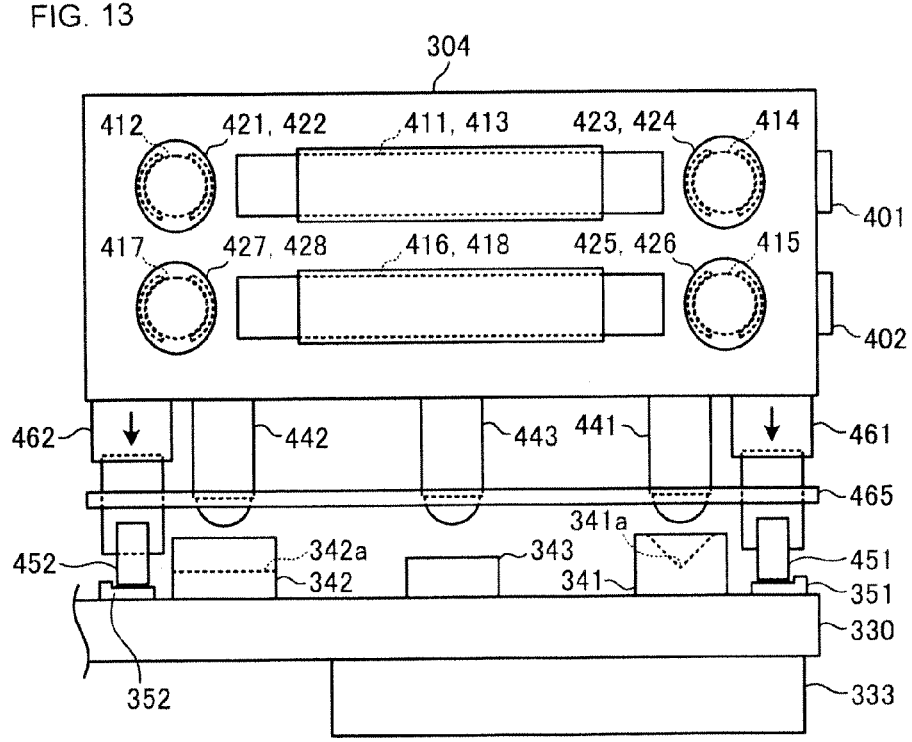
FIG. 13 is a front view of a first main amplifier according to a third embodiment of the present disclosure.

FIG. 13 is a perspective front view of a first main amplifier according to a third embodiment of the present disclosure. FIG. 13 illustrates a state in which the leg portions 441, 442, and 443 are distanced from the frame 330. In the third embodiment, a plate 465 may be anchored to the extension mechanisms 461, 462, 463, and 464 (here, the extension mechanisms 463 and 464 are not depicted in the drawing), and the plate 465 may be pressed downward together with the wheels 451 and 452 by the extension mechanisms 461, 462, 463, and 464. The plate 465 may have through-holes formed therein, through which the leg portions 441, 442, and 443 may pass. Extending the extension mechanisms 461, 462, 463, and 464 may allow the distance between the first main amplifier 304 and the wheels 451, 452, 453, and 454 (here, the wheels 453 and 454 are not depicted in the drawing) to be increased. Providing the plate 465 anchored to the extension mechanisms 461, 462, 463, and 464 may allow the first main amplifier 304 to be held substantially horizontally even when each of the extension mechanisms is extended at differing speed. Other points may be similar to those of the first embodiment described with reference to FIG. 7B.

7. Fourth Embodiment

Figure 14:
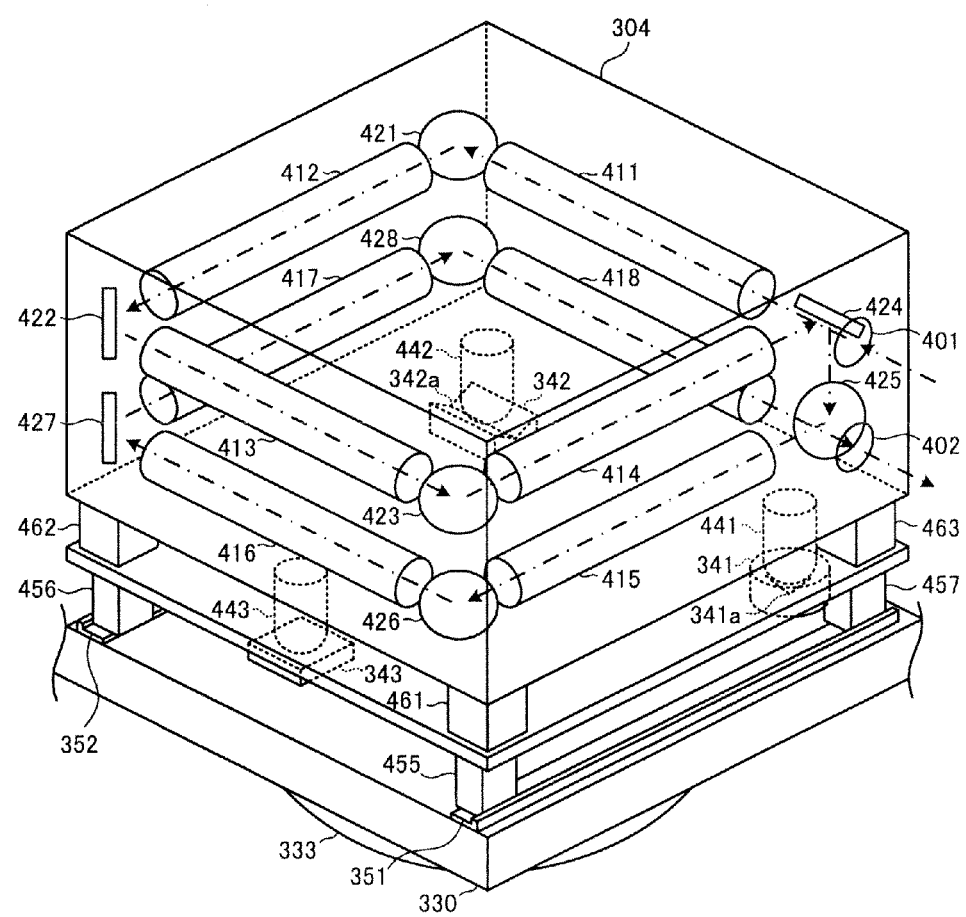
FIG. 14 is a perspective view of a first main amplifier according to a fourth embodiment of the present disclosure.

FIG. 14 is a perspective view of a first main amplifier according to a fourth embodiment of the present disclosure. In the fourth embodiment, the wheels for traveling along the rails 351 and 352 do not need to be provided. The extension mechanisms 461, 462, 463, and 464 (here, the extension mechanism 464 is not depicted in the drawing) may be provided with guide followers 455, 456, 457, and 458 (here, the guide follower 458 is not depicted in the drawing), respectively. The configuration may be such that the guide followers 455, 456, 457, and 458 may travel along the rails 351 and 352. Other points may be similar to those of the first embodiment described with reference to FIG. 5.

8. Fifth Embodiment

Figure 15:
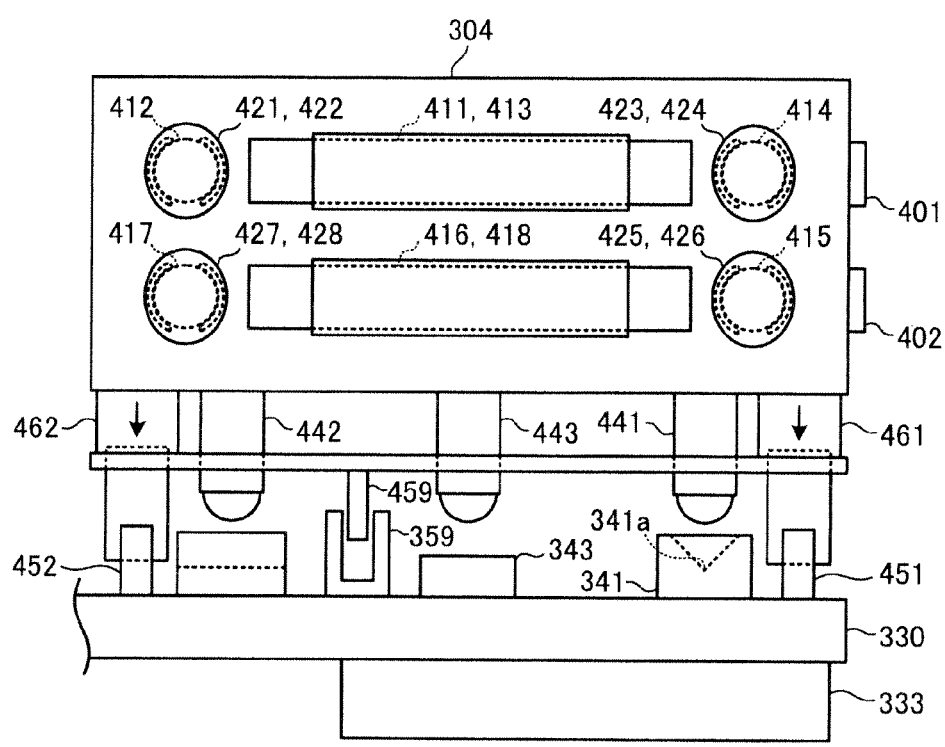
FIG. 15 is a front view of a first main amplifier according to a fifth embodiment of the present disclosure.

FIG. 15 is a front view of a first main amplifier according to a fifth embodiment of the present disclosure. In the fifth embodiment, the configuration may be such that the rails are not provided and the wheels 451, 452, 453, and 454 (here, the wheels 453 and 454 are not depicted in the drawing) may be allowed to travel along a given surface of the frame 330.

As illustrated in FIG. 15, the frame 330 may be provided with a single guide 359, and the first main amplifier 304 may be provided with a guide follower 459 that is movable along the guide 359. The guide 359 may be U-shaped in cross-section, and the guide follower 459 may be configured to move along the guide 359 in a state where the guide follower 459 is pinched by the guide 359. Other points may be similar to those of the first embodiment described with reference to FIG. 7A.

9. Sixth Embodiment

Figure 16:
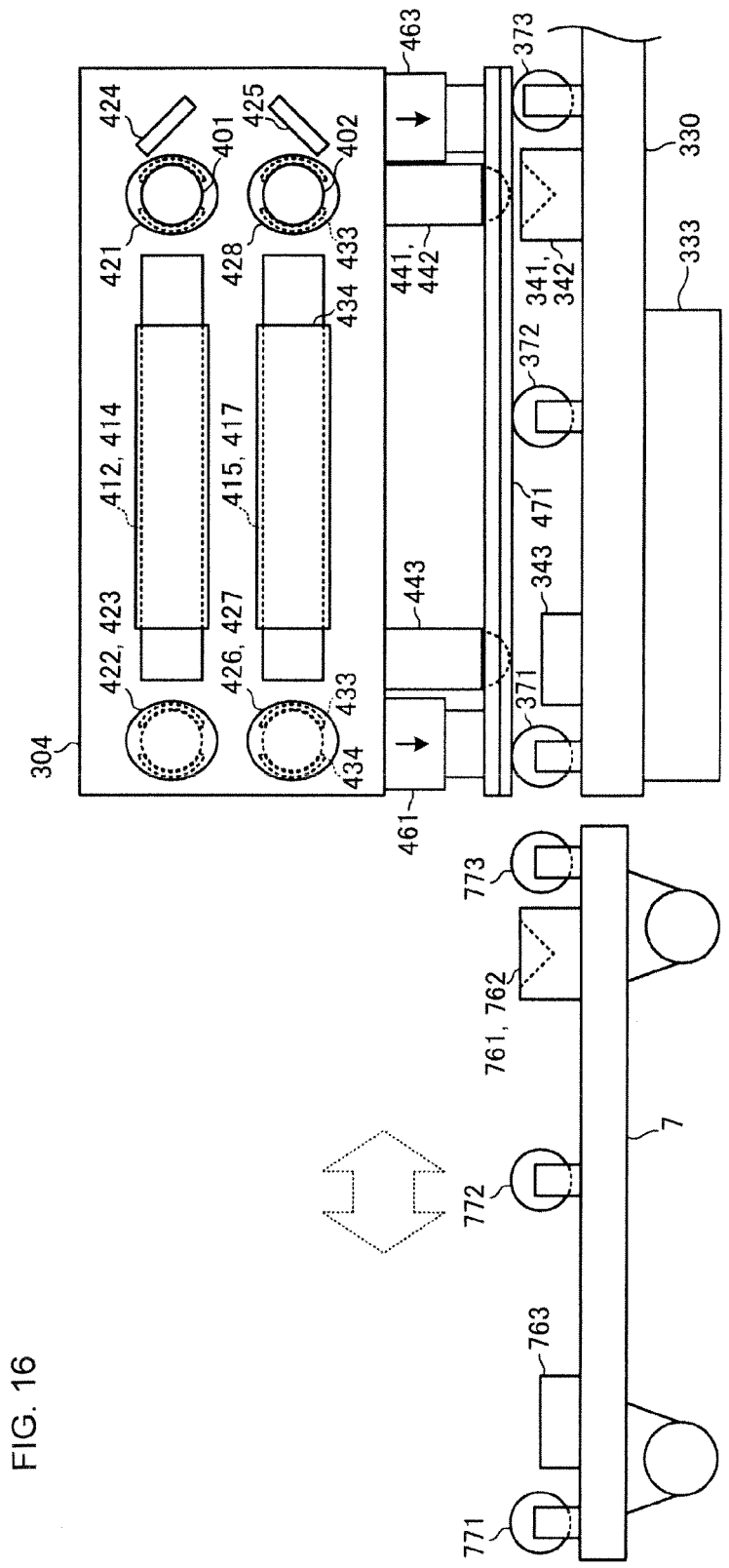
FIG. 16 is a side view of a first main amplifier according to a sixth embodiment of the present disclosure.

FIG. 16 is a side view of a first main amplifier according to a sixth embodiment of the present disclosure. In the sixth embodiment, the frame 330 may be provided with wheels 371, 372, and 373, in place of the rails. The wheels 371, 372, and 373 may be configured to be rotatable at predetermined positions on the frame 330. Meanwhile, the extension mechanisms 461 and 463 and the extension mechanisms 462 and 464 (not shown) of the first main amplifier 304 may be provided with rails 471 anchored thereto, respectively. The rails 471 may be placed on the wheels 371, 372, and 373. The configuration may be such that the first main amplifier 304 can be moved along with the rails 471 as the wheels 371, 372, and 373 rotate.

Further, the carriage 7 may be provided with wheels 771, 772, and 773. With this, the first main amplifier 304 may be removed from the frame 330 onto the carriage 7 and be transported to a desired maintenance area.

In this way, the sixth embodiment may differ from the first embodiment described with reference to FIG. 8 in that the relationship between the rails and the wheels is reversed. Other points may be similar to those of the first embodiment described with reference to FIG. 8.

10. Seventh Embodiment

Figure 17:
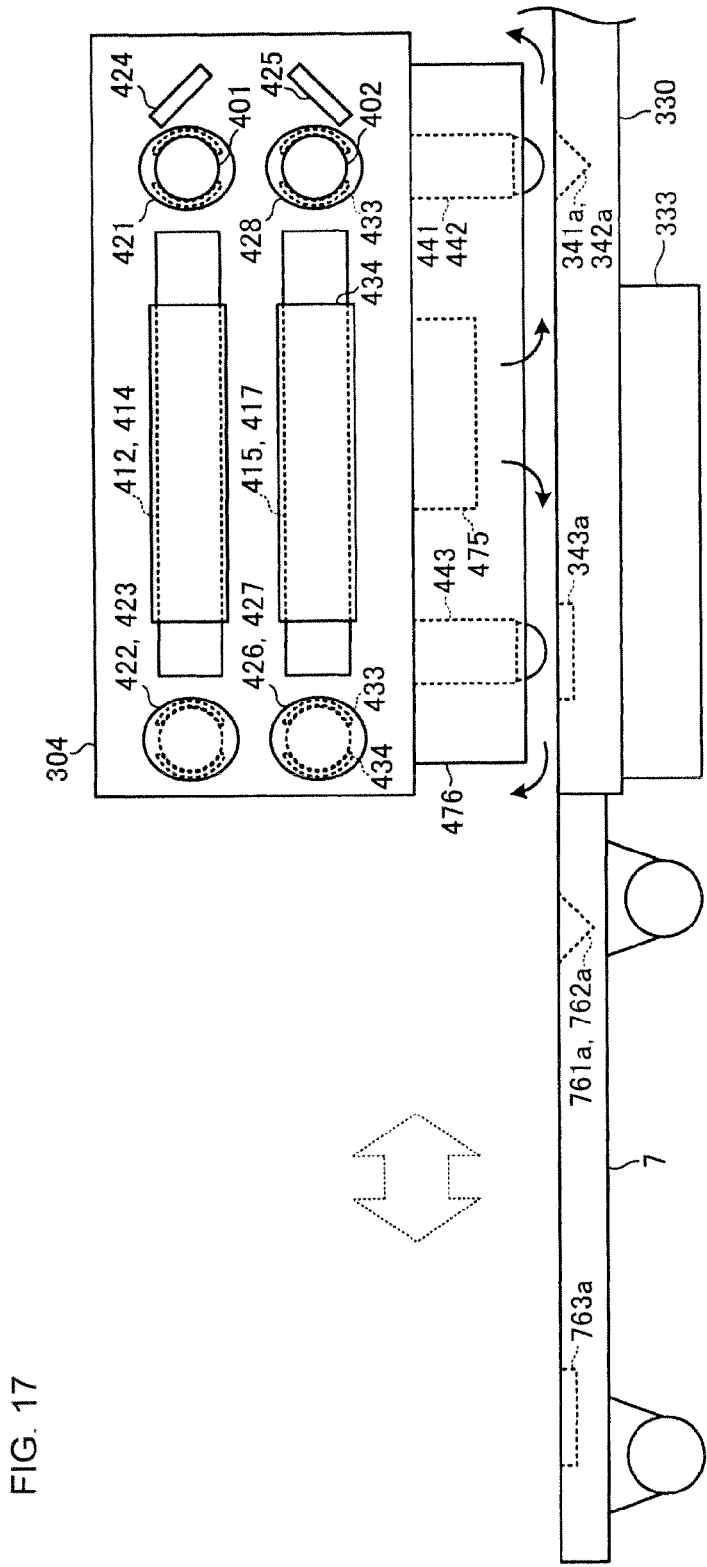
FIG. 17 is a side view of a first main amplifier according to a seventh embodiment of the present disclosure.

FIG. 17 is a side view of a first main amplifier according to a seventh embodiment of the present disclosure. In the seventh embodiment, the rails (guides) and the wheels (guide followers) do not need to be provided. As illustrated in FIG. 17, an air suspension (lifting mechanism) 475 may be provided on the bottom surface of the first main amplifier 304. A skirt 476 may be provided around the air suspension 475. Blowing a high-pressure gas out from the air suspension 475 may increase the gas pressure inside the skirt to above the atmospheric pressure, whereby the first main amplifier 304 may be lifted. With this, the first main amplifier 304 may be removed from the frame 330 to the carriage 7 with slight force. Other points may be similar to those of the first embodiment described with reference to FIG. 8.

11. Eighth Embodiment

Figure 18A:
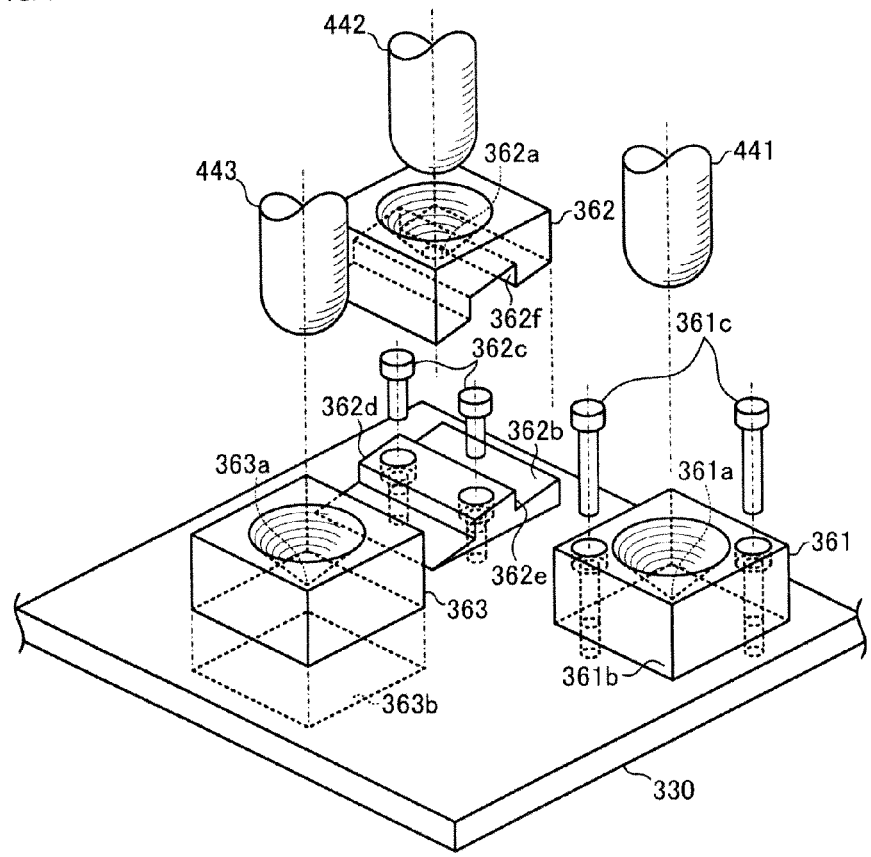
FIG. 18A is an exploded perspective view of a structure for supporting a module according to an eighth embodiment of the present disclosure.
Figure 18B:
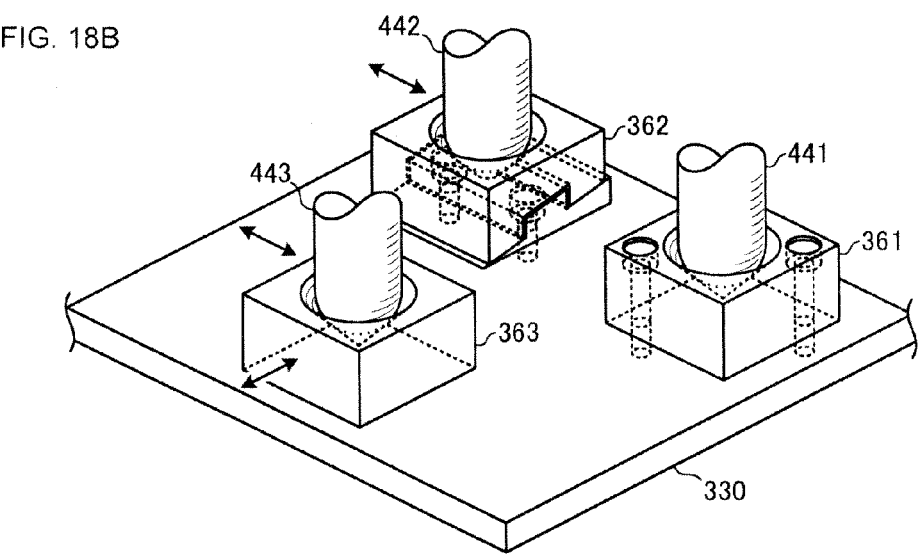
FIG. 18B is a perspective view of the structure for supporting the module according to the eighth embodiment.

FIG. 18A is an exploded perspective view of a structure for supporting a module according to an eighth embodiment of the present disclosure. FIG. 18B is a perspective view of the structure for supporting the module according to the eighth embodiment. In FIGS. 18A and 18B, only the leg portions 441, 442, and 443 of the module are illustrated.

In the eighth embodiment, conical recesses 361a, 362a, and 363a may be formed on upper surfaces of mounts 361, 362, and 363, respectively. Here, each of the recesses may be hemispherical in shape, instead of being conical. The mount 361 may be anchored on an installation portion 361b of the frame 330 by pins 361c or bolts. With this, the module may be positioned such that the horizontal movement of the leg portion 441 is restricted.

A placement table 362d may be anchored on the frame 330 by pins 362c or bolts. The mount 362 may be placed on the placement table 362d. An installation portion 362b having a step 362e and a slant may be formed on the upper surface of the placement table 362d. A step 362f to correspond to the step 362e may be formed on the bottom surface of the mount 362. The steps 362e and 362f may be formed by a cubic key and a keyway of a corresponding shape. The mount 362 does not need to be fixed onto the placement table 362d.

When the mount 362 is placed on the installation portion 362b of the placement table 362d, the mount 362 may slide along the slant of the installation portion 362b by the gravitational force, whereby the step 362f may be pressed against the step 362e. The installation portion 362b may preferably be tilted at an angle greater than the angle of friction. The mount 362 may be movable along the step 362e in a state where the step 362f is pressed against the step 362e. With this, the leg portion 442 of the module may be allowed to move along the step 362e.

The mount 363 may be placed on an installation portion 363b of the frame 330 and does not need to be anchored onto the installation portion 363b. That is, the mount 363 may be movable along the surface of the installation portion 363b. With this, the leg portion 443 may be supported so as to be movable along with the mount 363 within the horizontal plane.

According to the eighth embodiment, the leg portions 441, 442, and 443 may be supported by the conical recesses 361a, 362a, and 363a formed in the mounts 361, 362, and 363; thus, the contact portions between the mounts 361, 362, and 363 and the respective leg portions 441, 442, and 443 may be linear, rather than being points, whereby the load may be dispersed. Accordingly, the mounts 361, 362, and 363 and the leg portions 441, 442, and 443 may stand a large load of a module. Here, the tip of each of the leg portions 441, 442, and 443 does not need to be round, and may be in any shape having a size and a shape that make contact with the inner surface of the recess.

Further, according to the eighth embodiment, the upper surface of the placement table 362d, on which the mount 362 is placed, is slanted, and the step 362e is formed thereon; thus, the mount 362 may be pressed against the step 362e. Accordingly, the mount 362 may be positioned precisely along the step 362e. Other points may be similar to those of the first embodiment described with reference to FIG. 8.

12. Ninth Embodiment

Figure 19:
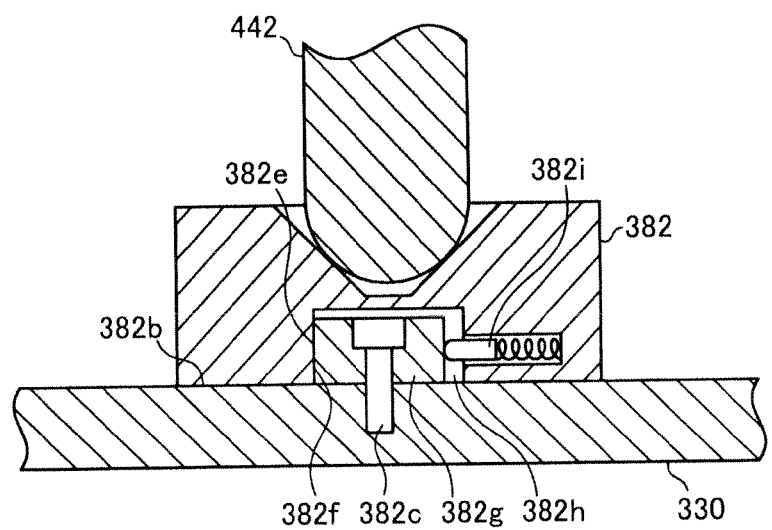
FIG. 19 is a sectional view of a second mount for supporting a module according to a ninth embodiment of the present disclosure.

FIG. 19 is a sectional view illustrating the configuration of a mount for supporting a module according to a ninth embodiment of the present disclosure. In the ninth embodiment, in place of the mount 362 and the placement table 362d (see FIG. 18A) of the eighth embodiment, a mount 382 placed on an installation portion 382b that does not have a slant may be used.

A step 382e may be formed on the installation portion 382b. A step 382f to correspond to the step 382e may be formed on the bottom surface of the mount 382. The steps 382e and 382f may be formed by a key 382g anchored on the installation portion 382b by a pin 382c or a bolt and a keyway 382h having a shape that corresponds to the key 382g.

The mount 382 may be provided with a plunger 382i biased by an elastic member toward the inside of the keyway 382h. As the mount 382 is placed on the installation portion 382b, the plunger 382i may be pressed against the key 382g. With this, the step 382f may be pressed against the step 382e. The mount 382 may be movable along the step 382e (depthwise direction in FIG. 19) in a state where the step 382f is pressed against the step 382e. With this, the leg portion 442 of the module may be supported so as to be movable in the direction along the step 382e. Other points may be similar to those of the eighth embodiment described with reference to FIGS. 18A and 18B.

13. Tenth Embodiment

Figure 20A:
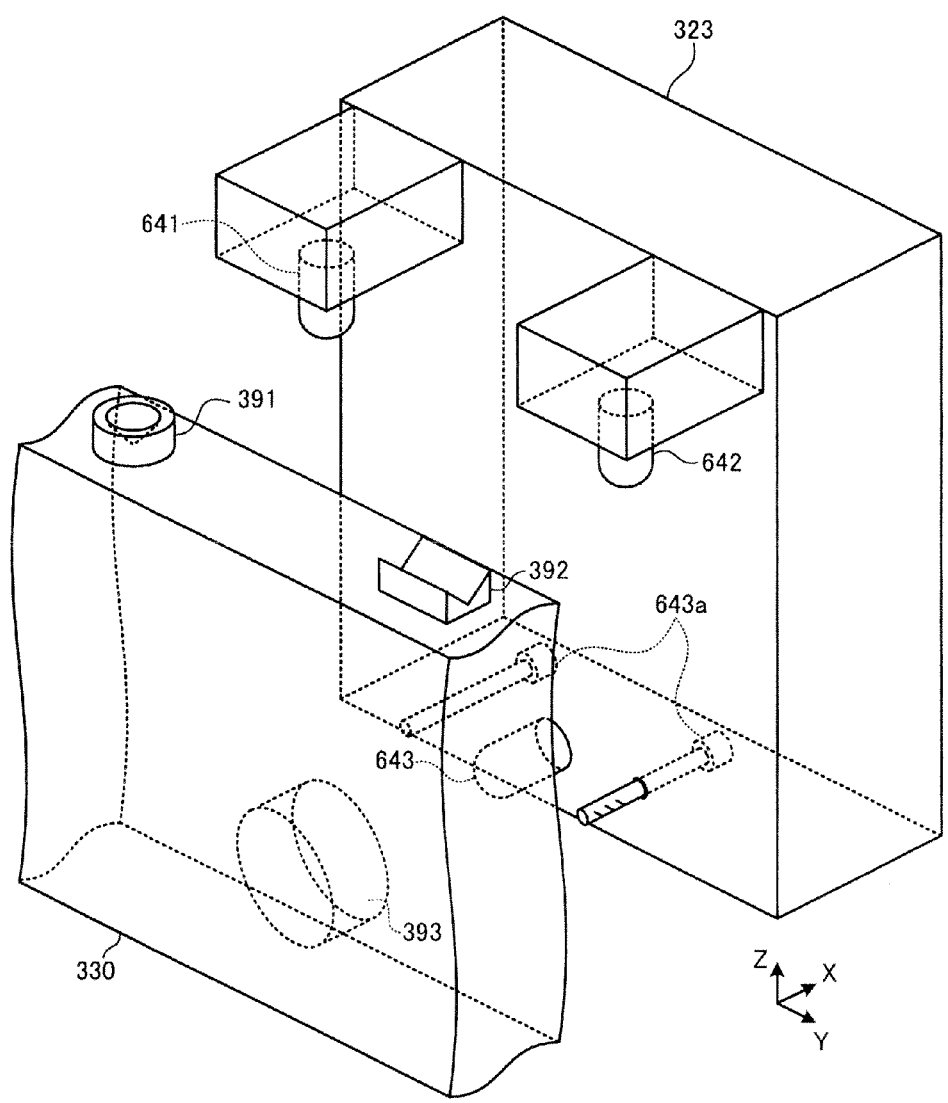
FIG. 20A is an exploded perspective view of a structure for supporting a module according to a tenth embodiment of the present disclosure.
Figure 20B:
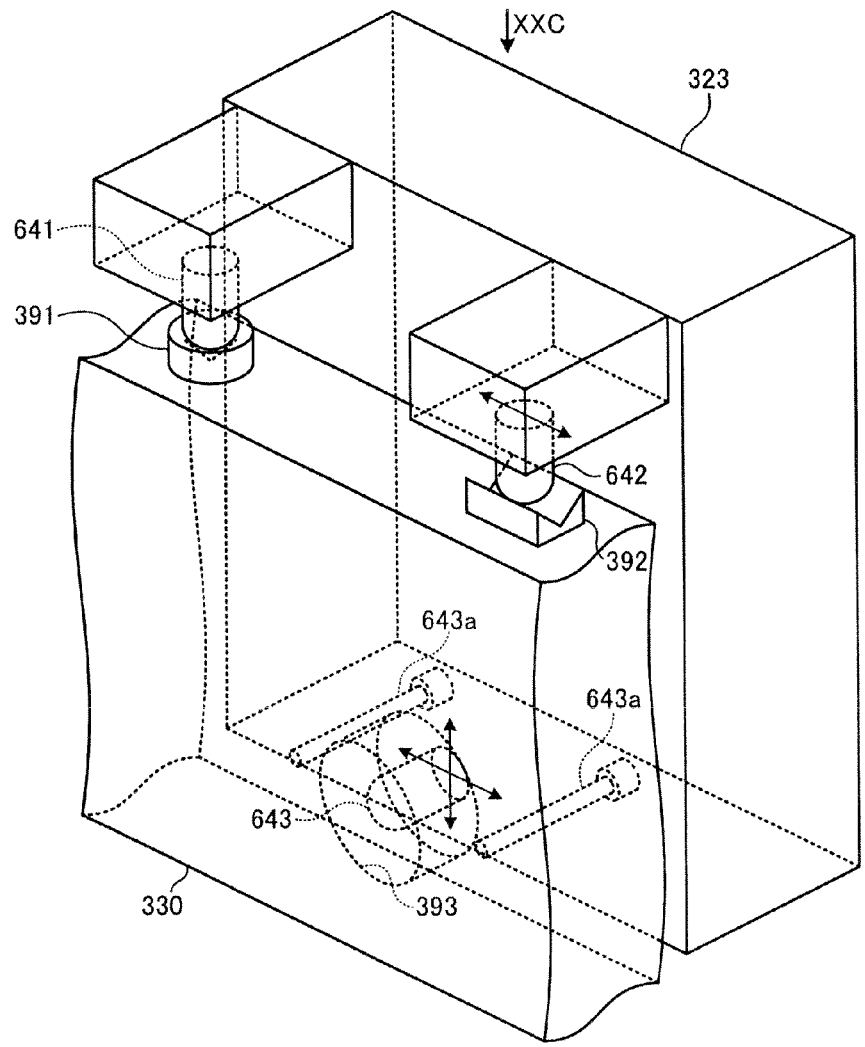
FIG. 20B is a perspective view of the structure for supporting the module according to the tenth embodiment.
Figure 20C:
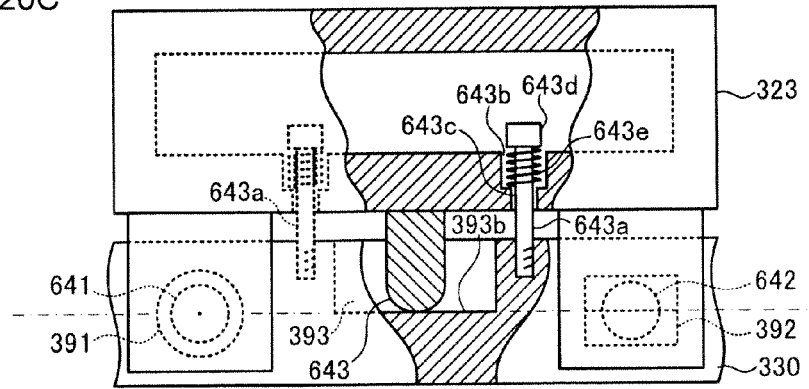
FIG. 20C is a partial sectional view of the structure shown in FIG. 20B, as viewed in the direction of an arrow XXC.

FIG. 20A is an exploded perspective view of a structure for supporting a module according to a tenth embodiment of the present disclosure. FIG. 20B is a perspective view of the structure for supporting the module according to the tenth embodiment. FIG. 20C is a partial sectional view of the structure shown in FIG. 20B, as viewed in the direction of an arrow XXC. In FIGS. 20A through 20C, optical elements inside the module and a window or a tube through which the laser beam travels are not depicted.

In the tenth embodiment, the frame 330 may further include a plate-shaped portion. A module, such as the third beam delivery unit 323, may be disposed to the side of the plate-shaped portion of the frame 330. The third beam delivery unit 323 may be disposed such that its lengthwise direction coincides with the direction of gravitational force. In the tenth embodiment, the third beam delivery unit 323 may be supported by the side of the frame 330, instead of being supported by the upper surface of the bottom portion of the frame 330, as described with reference to FIGS. 10A and 10B.

Mounts 391 and 392, on which the leg portions 641 and 642 of the third beam delivery unit 323 may be placed, respectively, may be provided on the upper surface of the plate-shaped portion of the frame 330. The leg portion 641 may be placed on the mount 391, whereby the leg portion 641 may be positioned such that its movement along the horizontal plane is restricted. The leg portion 642 may be placed on the mount 392, whereby the leg portion 642 may be positioned so as to be movable in the Y-direction.

A mount 393 may be formed on the side of the plate-shaped portion of the frame 330. The mount 393 may be a recess formed in the plate-shaped portion of the frame 330. The leg portion 643 of the third beam delivery unit 323 may be provided on a surface thereof which opposes the plate-shaped portion of the frame 330. The leg portion 643 may be pressed against the mount 393 so as to be movable in the direction along the side surface of the plate-shaped portion of the frame 330. A planar surface 393b of the mount 393, against which the leg portion 643 is pressed, may preferably be formed on a plane along a plane containing the centers of the mounts 391 and 392, as illustrated in FIG. 20C.

Bolts 643a may be inserted into respective through-holes (each including a large diameter portion 643b and a small diameter portion 643c) formed in the wall of the third beam delivery unit 323 and be screwed into the frame 330, so that the leg portion 643 is pressed against the mount 393. An elastic member 643e, such as a spring, may be disposed between a head 643d of the bolt 643a and a bottom surface of the large diameter portion 643b, whereby the third beam delivery unit 323 may be pressed against the mount 393. In order to press the third beam delivery unit 323 against the mount 393, a magnet or the like, in place of the bolts 643a, may be used as well. A gap may be formed between the bolt 643a and the small diameter portion 643c, so that the third beam delivery unit 323 may move easily along the side surface of the plate-shaped portion of the frame 330.

According to the tenth embodiment, even when the module is tall with respect to the dimensions of the bottom surface of the module and the module may fall when being support only at the bottom surface thereof, the module may be supported stably. Other points may be similar to those of the first embodiment described with reference to FIG. 8.

14. Eleventh Embodiment

Figure 21:
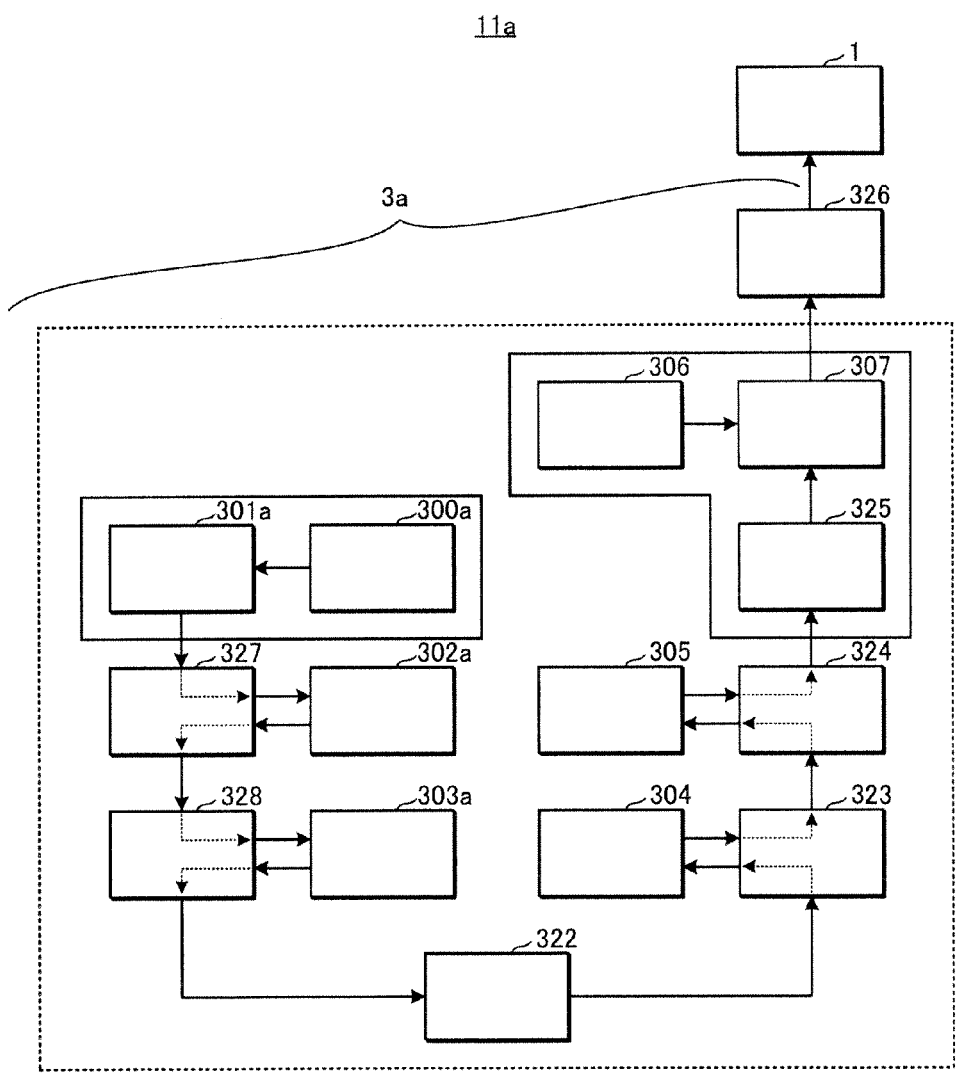
FIG. 21 is a block diagram illustrating the configuration of an EUV light generation system according to an eleventh embodiment of the present disclosure.

FIG. 21 is a block diagram illustrating the configuration of an EUV light generation system according to an eleventh embodiment of the present disclosure. A laser apparatus 3a included in an EUV light generation system 11a may include a master oscillator 300a, first, second, and third preamplifiers 301a, 302a, and 303a, the first and second main amplifiers 304 and 305, the pre-pulse laser apparatus 306, and the beam path adjusting unit 307.

Figure 22A:
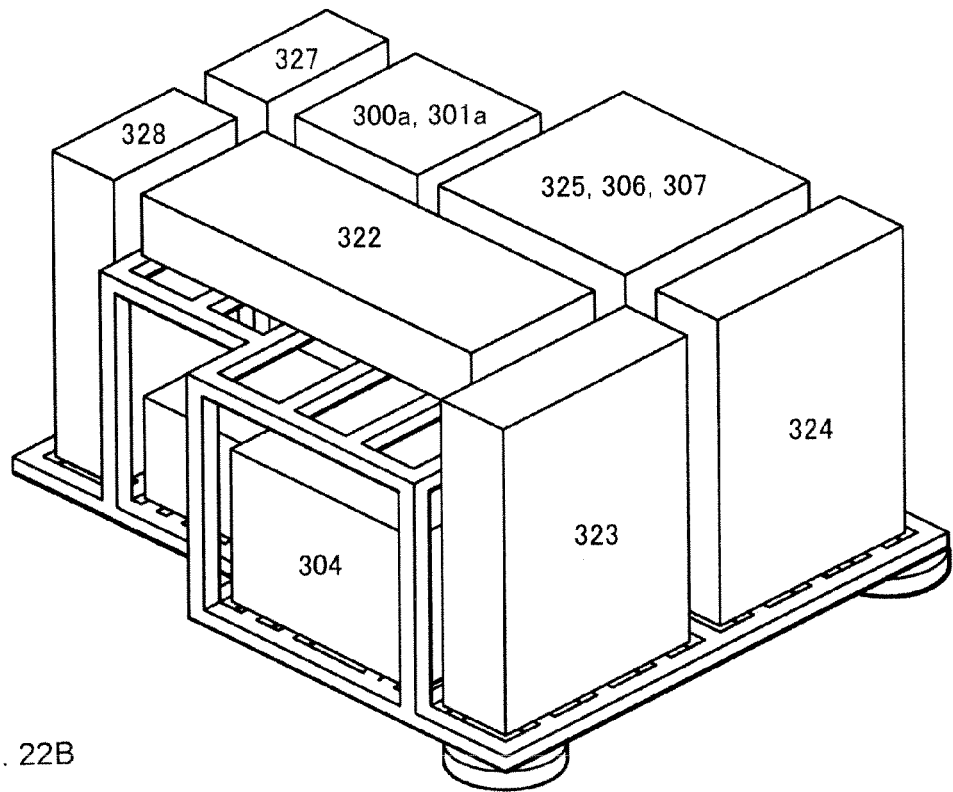
FIG. 22A is a perspective view illustrating a specific arrangement of modules constituting the laser apparatus according to the eleventh embodiment.
Figure 22B:
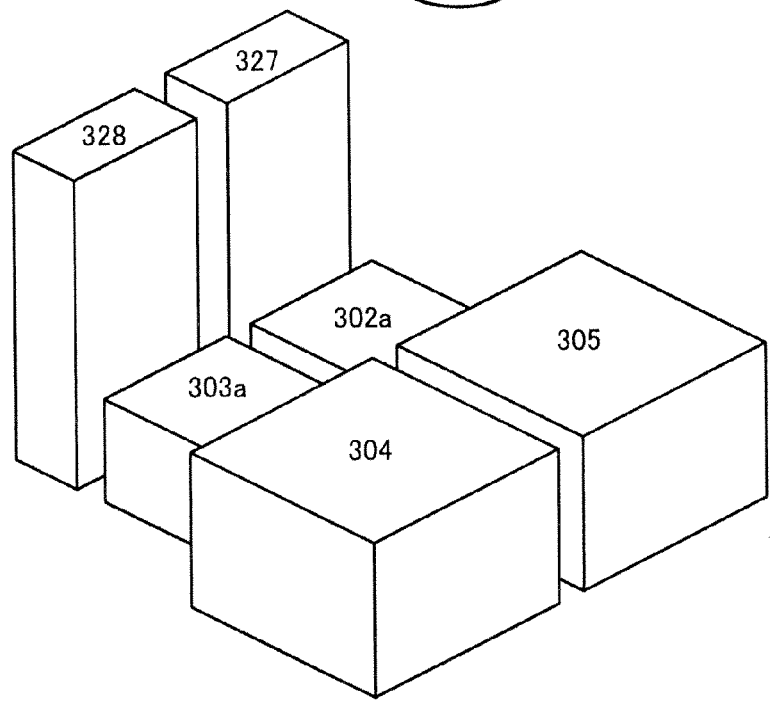
FIG. 22B is a perspective view illustrating the arrangement of the modules disposed in the lower level in FIG. 22A.
Figure 22C:
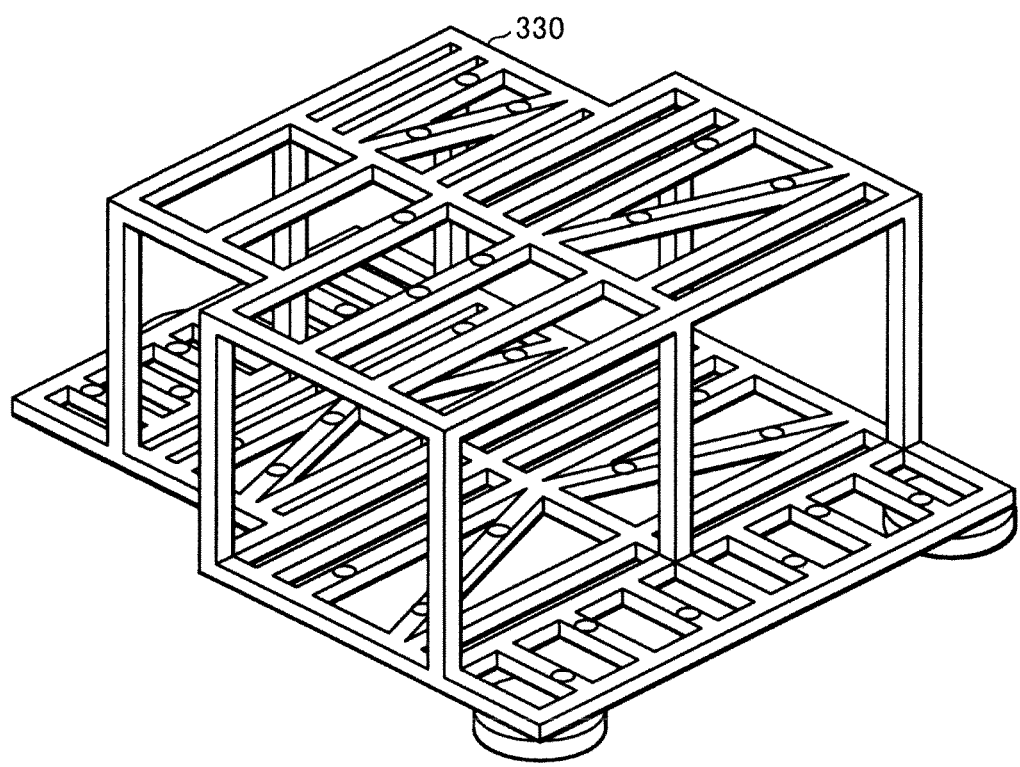
FIG. 22C is a perspective view illustrating the frame in FIG. 22A.

FIG. 22A is a perspective view illustrating a specific arrangement of modules constituting the laser apparatus according to the eleventh embodiment. FIG. 22B is a perspective view illustrating the arrangement of the modules disposed in the lower level in FIG. 22A. FIG. 22C is a perspective view illustrating the frame in FIG. 22A.

The master oscillator 300a and the first preamplifier 301a may be housed in a single housing. In the eleventh embodiment, each of the second and third preamplifiers 302a and 303a may be a fast-axial-flow amplifier, as in the first and second main amplifiers 304 and 305. Accordingly, the first, second, third, and fourth beam adjusting units 311, 312, 313, and 314 of the first embodiment do not need to be provided.

In the eleventh embodiment, a seventh beam delivery unit 327 may be provided between the first and second preamplifiers 301a and 302a. Seventh and eighth beam delivery units 327 and 328 may be provided between the second and third preamplifiers 302a and 303a. The eighth, second, and third beam delivery units 328, 322, and 323 may be provided between the third preamplifier 303a and the first main amplifier 304.

According to the eleventh embodiment, the laser apparatus 3a may be reduced in size. Support mechanisms of the modules in the eleventh embodiment may be similar to those in the first embodiment.

The above-described embodiments and the modifications thereof are merely examples for implementing the present disclosure, and the present disclosure is not limited thereto. Making various modifications according to the specifications or the like is within the scope of the present disclosure, and it is apparent from the above description that other various embodiments are possible within the scope of the present disclosure. For example, the modifications illustrated for each of the embodiments can be applied to other embodiments as well.

The terms used in this specification and the appended claims should be interpreted as "non-limiting." For example, the terms "include" and "be included" should be interpreted as "not limited to the stated elements." The term "have" should be interpreted as "not limited to the stated elements."

Further, the modifier "one (a/an)" should be interpreted as "at least one" or "one or more."

The invention claimed is:
1. A laser apparatus, comprising:
a first module including an oscillator configured to output a laser beam and an oscillator support portion for supporting the oscillator;
a second module including a beam delivery unit for delivering the laser beam and a beam delivery unit support portion for supporting the beam delivery unit;
a third module including an amplifier for amplifying the laser beam and an amplifier support portion for supporting the amplifier; and
a frame on which the first, second, and third modules are placed, the frame including mounts on which the oscillator support portion, the beam delivery unit support portion, and the amplifier support portion are placed.

2. The laser apparatus according to claim 1, wherein each of the first, second, and third modules further includes a lifting mechanism for lifting each of the modules with respect to the mount.

3. The laser apparatus according to claim 1, further comprising
at least two guides provided on the frame, and
at least two groups of guide followers for supporting each of the first, second, and third modules, the guide followers allowing the modules to be moved by traveling along the at least two guides.

4. The laser apparatus according to claim 3, wherein each of the modules further includes a lifting mechanism for lifting the module by extending or contracting a distance between the module and the at least two groups of guide followers.

5. The laser apparatus according to claim 1, wherein the first, second, and third modules are placed in first and second levels, the second level being located below the first level.

6. The laser apparatus according to claim 5, wherein a total weight of the modules placed in the second level is greater than a total weight of the modules placed in the first level.

7. A laser apparatus, comprising:
a module including an amplifier for amplifying a laser beam and first, second, and third support portions for supporting the amplifier; and
a frame on which the module is placed, the frame including first, second, and third mounts on which the first, second, and third support portions are placed, respectively,
wherein:
the module further includes an input portion through which an input beam enters the module from a first external unit, and an output portion through which an output beam is outputted toward a second external unit,
the first support portion is provided at a first position toward the input portion as viewed from the center of the module,
the second support portion is provided at a second position toward the direction in which the input beam enters the module as viewed from the first position, and
the third support portion is provided at a third position.

8. The laser apparatus according to claim 7, wherein
the first mount positions the first support portion at a predetermined position,
the second mount supports the second support portion such that the second support portion is movable along a direction in which the input beam enters the module, and
the third mount supports the third support portion such that the third support portion is movable within a horizontal plane.

9. A laser apparatus, comprising:
a module including an amplifier for amplifying a laser beam and first, second, and third support portions for supporting the amplifier; and
a frame on which the module is placed, the frame including first, second, and third mounts on which the first, second, and third support portions are placed, respectively,
wherein:
the module further includes an output portion through which an output beam is outputted toward an external unit,
the first support portion is provided at a first position toward the output portion as viewed from the center of the module,
the second support portion is provided at a second position opposite to the direction in which the output beam is outputted from the module as viewed from the first position, and
the third support portion is provided at a third position.

10. The laser apparatus according to claim 9, wherein
the first mount positions the first support portion at a predetermined position,
the second mount supports the second support portion such that the second support portion is movable in a direction in which the output beam is outputted from the module, and
the third mount supports the third support portion such that the third support portion is movable within a horizontal plane.

11. A laser apparatus, comprising:
a module including an amplifier for amplifying a laser beam and first, second, and third support portions for supporting the amplifier; and
a frame on which the module is placed, the frame including first, second, and third mounts on which the first, second, and third support portions are placed, respectively,
wherein:
the module further includes an input portion through which an input beam enters the module from a first external unit, and an output portion through which an output beam is outputted toward a second external unit,
the first support portion is provided at a first position toward the input portion as viewed from the center of the module,
the second support portion is provided at a second position toward the output portion as viewed from the center of the module, and
the third support portion is provided at a third position.

12. The laser apparatus according to claim 11, wherein
the first mount positions the first support portion at a predetermined position,
the second mount supports the second support portion such that the second support portion is movable in a direction in which the output beam is outputted from the module, and
the third mount supports the third support portion such that the third support portion is movable within a horizontal plane.

13. The laser apparatus according to claim 11, wherein
the first mount positions the second support portion at a predetermined position,
the second mount supports the first support portion such that the first support portion is movable in a direction in which the input beam enters the module, and
the third mount supports the third support portion such that the third support portion is movable within a horizontal plane.

14. A laser apparatus, comprising:
a module including an amplifier for amplifying a laser beam and first, second, and third support portions for supporting the amplifier; and
a frame on which the module is placed, the frame including first, second, and third mounts on which the first, second, and third support portions are placed, respectively, and first, second, and third installation portions on which the first, second, and third mounts are placed, respectively, wherein:
the first mount positions the first support portion at a predetermined position of the frame,
the second mount is placed on the second installation portion so as to be movable along a step formed on the second installation portion, the second installation portion being inclined with respect to a horizontal plane, whereby the second mount is pressed against the step, and the second mount supports the second support portion and positions the second support portion at a predetermined position of the second mount such that the second support portion is movable in a direction along the step with respect to the frame, and
the third mount supports the third support portion such that the third support portion is movable with respect to the frame within the horizontal plane.

15. A laser apparatus, comprising:
a module including an amplifier for amplifying a laser beam and first, second, and third support portions for supporting the amplifier; and
a frame on which the module is placed, the frame including first, second, and third mounts on which the first, second, and third support portions are placed, respectively, and first, second, and third installation portions on which the first, second, and third mounts are placed, respectively, wherein:
the first mount positions the first support portion at a predetermined position of the frame,
the second mount is placed on the second installation portion so as to be movable along a step formed on the second installation portion, one of the second installation portion and the second mount being provided with an elastic member, whereby the second mount is pressed against the step, and the second mount supports the second support portion and positions the second support portion at a predetermined position of the second mount such that the second support portion is movable in a direction along the step with respect to the frame, and
the third mount supports the third support portion such that the third support portion is movable with respect to the frame within a horizontal plane.

16. A laser apparatus, comprising:
a module including a beam delivery unit for delivering a laser beam and first, second, and third support portions for supporting the beam delivery unit; and
a frame on which the module is placed, the frame including first, second, and third mounts on which the first, second, and third support portions are placed, respectively, wherein:
the first and second mounts are provided on a first surface of the frame,
the third mount is provided on a second surface of the frame, the second surface intersecting with the first surface,
the first mount positions the first support portion at a predetermined position,
the second mount supports the second support portion such that the second support portion is movable toward the first mount, and
the third mount supports the third support portion such that the third support portion is movable along the second surface.

17. A frame, comprising
mounts on which support portions of first, second, and third modules are placed, respectively, the first module including an oscillator configured to output a laser beam and an oscillator support portion for supporting the oscillator, the second module including a beam delivery unit for delivering the laser beam and a beam delivery unit support portion for supporting the beam delivery unit, and the third module including an amplifier for amplifying the laser beam and an amplifier support portion for supporting the amplifier.

* * * * *